US006836884B1

(12) United States Patent
Evans et al.

(10) Patent No.: US 6,836,884 B1
(45) Date of Patent: Dec. 28, 2004

(54) METHOD AND SYSTEM FOR EDITING SOFTWARE PROGRAMS

(75) Inventors: William G. Evans, Woodinville, WA (US); Jennifer A. Hamilton, Bellevue, WA (US); Michael M. Magruder, Issaquah, WA (US); Vance P. Morrison, Kirkland, WA (US); Lawrence B. Sullivan, Jr., Renton, WA (US); Sean E. Trowbridge, Sammamish, WA (US); Jason L. Zander, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 663 days.

(21) Appl. No.: 09/873,596

(22) Filed: Jun. 4, 2001

(51) Int. Cl.[7] .............................................. G06F 9/45
(52) U.S. Cl. ...................... 717/140; 717/124; 717/127
(58) Field of Search ............................... 717/109, 110, 717/116, 124, 125, 126, 127, 140, 152, 129

(56) References Cited

U.S. PATENT DOCUMENTS

| 4,667,290 | A | * | 5/1987 | Goss et al. .................. 717/147 |
| 5,586,328 | A | | 12/1996 | Caron et al. ................ 395/705 |
| 6,044,218 | A | * | 3/2000 | Faustini ...................... 717/107 |
| 6,094,528 | A | | 7/2000 | Jordan ........................ 395/704 |
| 6,237,135 | B1 | * | 5/2001 | Timbol ....................... 717/107 |
| 6,269,475 | B1 | * | 7/2001 | Farrell et al. ............... 717/113 |
| 6,327,702 | B1 | * | 12/2001 | Sauntry et al. ............. 717/118 |
| 6,389,590 | B1 | * | 5/2002 | Miller et al. ................ 717/140 |
| 6,412,107 | B1 | * | 6/2002 | Cyran et al. ................ 717/148 |
| 6,484,313 | B1 | * | 11/2002 | Trowbridge et al. ........ 717/146 |
| 6,557,023 | B1 | * | 4/2003 | Taivalsaari .................... 718/1 |
| 6,557,168 | B1 | * | 4/2003 | Czajkowski ................ 717/151 |
| 6,560,774 | B1 | * | 5/2003 | Gordon et al. ............. 717/146 |
| 6,567,974 | B1 | * | 5/2003 | Czajkowski ................ 717/151 |
| 6,721,941 | B1 | * | 4/2004 | Morshed et al. ............ 717/127 |

OTHER PUBLICATIONS

Gustafsson et al, "Native code compilation of Erlang's bit syntax" Erlang workshop, ACM, pp 6–15, 2002.*
Newhall et al, "Performance measurement of dynamically compiled Java execuations", ACM JAVA, pp 42–50, 1999.*
Lee et al, "Optimizing ML with Run time code generation", ACM PLDI, pp 137–148 May 1996.*
Tabatabai et al, "fast,effective cod egenertaion in a just in time jave compiler", ACM SIGPLAN, pp 280–290, 1998.*
Adams, E., et al.; "*SunPro: Engineering a Practical Program Development Environment*", Advanced Programming Environments. Proceedings of an International Workshop; May 20, 1986, p. 86–96.
Truong, D., et al.; "*Measuring C++ Program Efficiency*", Dr. Dobb's Journal; vol. 25, No. 10, Oct. 2000, p. 62–67.
Fiddler, J. et al.: "*VxWorks–Unix Real–Time Network and Development System*", Wescon/86 Conference Record, 1986, p. 9/3/1–3.

* cited by examiner

Primary Examiner—Anil Khatri
(74) Attorney, Agent, or Firm—Amin & Turocy, LLP

(57) ABSTRACT

A method and system are disclosed for editing a software program in a common language runtime environment, wherein the software program has a source code component, an intermediate language component, and a native code component. The method comprises executing a first portion of the native code component, suspending execution of the native code component at a first point, and allowing a user to edit the source code component to create an edited source code component. The edited source code component is compiled using a source compiler to create an edited intermediate language component, and the edited intermediate language component is compiled using an intermediate language compiler to create an edited native code component. The edited native code component is then executed beginning at the point where execution was previously suspended.

53 Claims, 25 Drawing Sheets

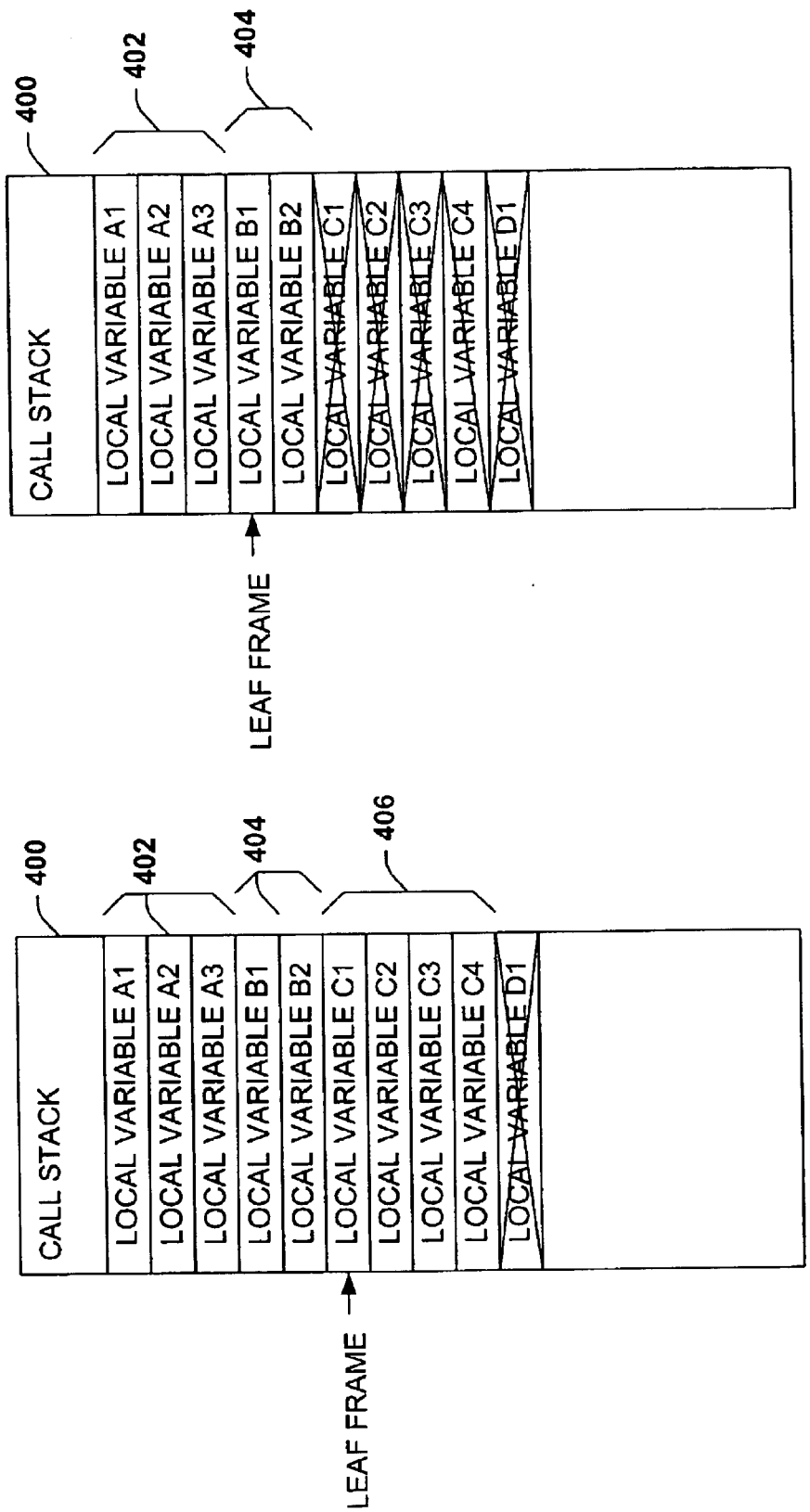

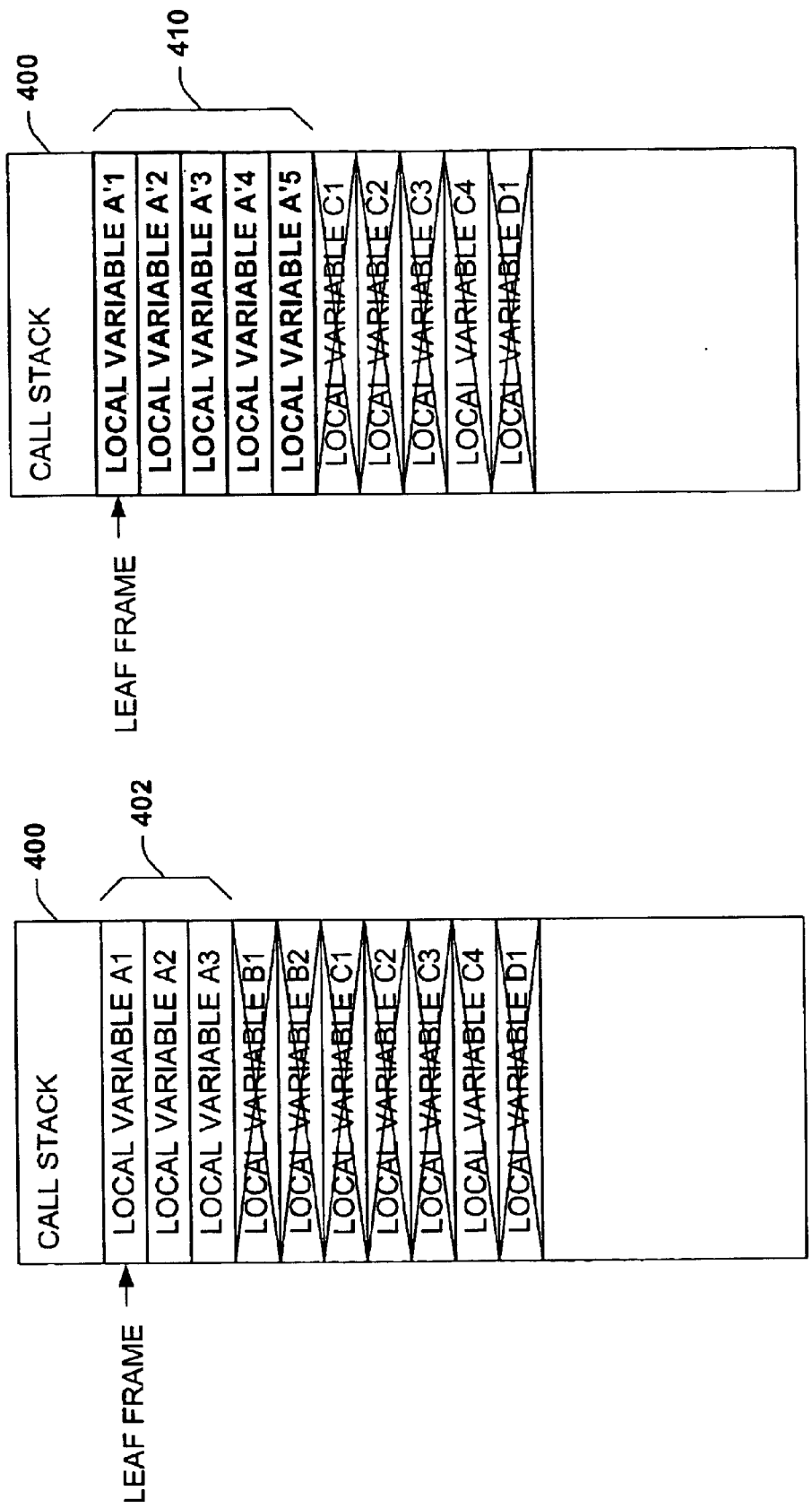

METHOD AND SYSTEM FOR EDITING SOFTWARE PROGRAMS

TECHNICAL FIELD

The present invention relates generally to computer systems, and more particularly to improved methods and systems for editing software programs in a computer system.

BACKGROUND

Editing and debugging systems are commonly employed to facilitate development of software programs. Such systems typically include or interact with compilers, which take source code written by a user and generate native code therefrom, which may be executed by a processor in a computer system or embedded system. The native code is generally specific to a given processor type or family, whereas the source code and the compiler are language specific. Thus, different compilers and debuggers are adapted for generating programs for execution on different processors from source code written in a given programming language.

Advances in software development technologies have resulted in the ability to develop software programs from software components written in different programming languages. Such advances facilitate the reuse of existing programs or software components, whereby programmers may employ the services or features of existing programs in generating new programs with higher functional performance. Recently, common language runtime systems have been developed in which such software components from diverse source languages may be easily joined together to form new software programs. However, current editing and debugging tools for common language runtime systems provide only limited functionality.

Other software development technologies provide runtime support for developed software by employing interpreters. An interpreter does not perform compilation of source code as a whole into machine-executable. Rather, the interpreter translates one program statement (e.g., in a source language program file) into machine language, executes it, then proceeds to the next statement. This differs from regular (e.g., compiled) executable programs that are presented to the computer as binary-coded instructions. Debugging interpreted programs may be facilitated by the line-by-line operation of the interpreter, since a single line of code can be tested interactively. However, interpreted programs generally run slower than do compiled programs. This is because a compiler translates the entire program before it is run, whereas an interpreter translates a line at a time when the program is run.

Existing editing and debugging tools for compiled programs typically do not offer line-by-line execution capabilities together with the ability to stop execution, edit a source program, and continue from the point where execution left off. In addition, debugging tools which provide edit and continue features are limited in the amount and nature of the edits which a user may perform. Moreover, such tools are not adaptable to debugging code in a common language runtime environment. Hence, there remains a need for improved software editing and debugging tools which provide advanced editing capabilities and which provide support for common language runtime environments.

SUMMARY

The following presents a simplified summary of the invention in order to provide a basic understanding of some aspects of the invention. This summary is not an extensive overview of the invention. It is intended to neither identify key or critical elements of the invention nor delineate the scope of the invention. Its sole purpose is to present some concepts of the invention in a simplified form as a prelude to the more detailed description that is presented later.

The invention comprises systems and methodologies by which a software program may be edited in a common language or other runtime environment, which provide for a wide range of editing capabilities not heretofore available. Such a software program may include a source code component created in one or more source code languages (e.g., Visual Basic, C++, C#, Java Script, APL, COBOL, Pascal, Eiffel, Haskell, ML, Oberon, Perl, Python, Scheme, Smalltalk, Objective Caml, and the like), an intermediate language component, and a native code component (e.g., machine executable instructions). The intermediate language component is created from the source code component using a language specific source compiler and the native code component is created from the intermediate language component using a just-in-time (JIT) compiler. The invention provides for partial execution of a native program in common language runtime system via an edit and continue component, wherein execution may be suspended at a point in the program. The partial execution and suspension may be achieved, for example, using single step execution in a debugger application interfaced with an edit and continue component via a debugging services interface, wherein a user steps through the source code one instruction at a time, or several instructions at a time.

While program execution is suspended, the user may modify or edit one or more portions of the source code component, and resume execution of the program at the point where execution was suspended. Resuming execution may include compiling the edited source code component using a source compiler associated with the debugger application to create an edited intermediate language component, and compiling the edited intermediate language component using the intermediate language (e.g., JIT) compiler to create an edited native code component, which may then be executed from the point where program execution left off. Compilation of the edited intermediate language component may be done on an as-needed basis in order to reduce the time needed to resume execution of the edited program. In addition, the as-needed compilation avoids unnecessary compiling where an edited portion of the program, such as a method, is not called subsequent to the point where execution is restarted. The invention thus advantageously allows a software developer to interactively execute portions of the code, make revisions or changes, and continue execution without having to restart the program execution from the beginning after each edit.

The user may make a variety of changes to the source code component during such editing and debugging operations. For instance, the user may add a new field to an object of a class or add a new method to a class, such as a virtual method. In addition, the user may change an existing method in the source code component, such as by adding a new variable or changing an algorithm in the existing source code method. In addition, the invention provides for adding variables to a method when the method is on one or more thread's call stacks. A user can also re-edit a method that was edited previously in accordance with the invention, regardless of whether or not it has been JIT compiled in the interim. Furthermore, the edits according to the invention are language independent, whereby the user may replace an existing method created in a first source language with a new method created in a second source language. The invention thus provides for editing functionality heretofore not available in editing and debugging tools for compiled software development, as well as improved editing and debugging support for program development in a common language runtime environment.

Once edits or changes have been made, the invention provides for using the changed source code components in the subsequent program execution. For example, a changed or edited method may be called during initial execution of a portion of the native code program, which then calls other methods. Where execution is suspended after the initial call to the method, the invention may include detecting a subsequent return to, or a new call to, the method which has been edited. The newly compiled native code for the edited method may then be selectively employed for subsequent execution of the method, which may be done on an as-needed basis. Thus, for example, the edited intermediate language component need not be compiled into an edited native code component until the method which was edited is needed for further program execution.

In addition, the invention provides for making other adjustments according to the user edits made while execution is suspended. For instance, where new variables have been added to a method, space therefor may be provided in existing stack frames in accordance with the invention, such as when a return to an edited method is detected using a breakpoint. The invention further provides for extending field tables in execution memory to facilitate allowing a user to add a new field to an object. In addition, the invention provides for computer-readable mediums with computer-executable instructions for editing software programs in a common language runtime environment or system.

To the accomplishment of the foregoing and related ends, certain illustrative aspects of the invention are described herein in connection with the following description and the annexed drawings. These aspects are indicative, however, of but a few of the various ways in which the principles of the invention may be employed and the present invention is intended to include all such aspects and their equivalents. Other advantages and novel features of the invention may become apparent from the following detailed description of the invention when considered in conjunction with the drawings.

BRIEF DESCRIPTION OF THE DRAWINGS

FIG. 24 is a schematic diagram further illustrating the call stack of FIGS. 20–23;

FIG. 25 is a schematic diagram further illustrating the call stack of FIGS. 20–24;

FIG. 26 is a schematic diagram further illustrating the call stack of FIGS. 20–25;

FIG. 27 is a schematic diagram further illustrating the call stack of FIGS. 20–26;

DETAILED DESCRIPTION

Figure 1:
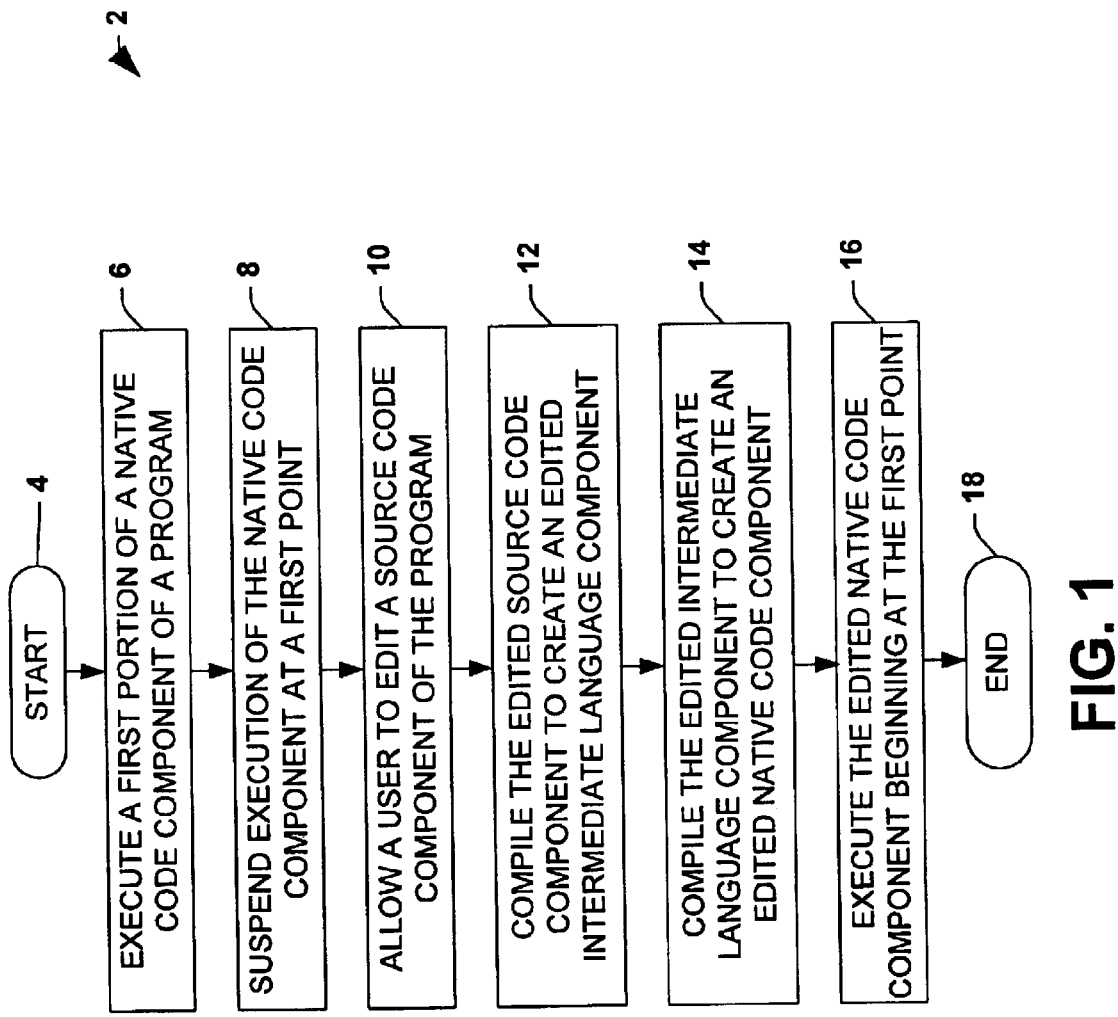
FIG. 1 is a flow diagram illustrating an exemplary method of editing a software program in a common language runtime environment in accordance with one aspect of the present invention.

The present invention is now described with reference to the drawings, wherein like reference numerals are used to refer to like elements throughout. In the following description, for purposes of explanation, numerous specific details are set forth in order to provide a thorough understanding of the present invention. It may be evident, however, to one skilled in the art that the present invention may be practiced without these specific details. Moreover, well-known structures and devices are illustrated in some instances in block diagram form in order to facilitate description of the present invention. Referring now to the drawings, the present invention comprises methods and systems for editing and debugging software programs in a common language runtime environment, with improved editing capabilities whereby a software developer may stop program execution, make edits to source code, and proceed from the point where program execution left off.

An exemplary method 2 is illustrated in FIG. 1 for editing a software program in accordance with an aspect of the present invention, which may be employed in a common language runtime environment. The software program may comprise a source code component, an intermediate language component, and a native code component. The source code component may be created in one or more source code languages (e.g., Visual Basic, C++, C#, Java Script, APL, COBOL, Pascal, Eiffel, Haskell, ML, Oberon, Perl, Python, Scheme, Smalltalk, Objective Caml, and the like), and the native code component may include machine executable instructions. The intermediate language component may be created from the source code component using a language specific source compiler and the native code component may be created from the intermediate language component, for example, using a just-in-time (JIT) compiler.

While the exemplary method 2 is illustrated and described herein as a series of acts, it will be appreciated that the present invention is not limited by the illustrated ordering of acts, as some acts may occur in different orders and/or concurrently with other acts apart from that shown and described herein, in accordance with the invention. In addition, not all illustrated acts may be required to implement a methodology in accordance with the present invention. The method 2 may find utility in association with the exemplary common language runtime system illustrated and described in greater detail hereinafter with respect to FIG. 3. However, it will be appreciated that the exemplary method 2, as well as other methodologies according to the invention, may be implemented in association with the apparatus and systems illustrated and described herein as well as in association with other systems not illustrated.

Beginning at 4, the method 2 comprises executing a first portion of a native code component at 6 and suspending execution of the native code component at a first point at 8. For example, a user may execute native code at 6 corresponding to a single source code statement or instruction, or a range of such source code instructions, after which execution is suspended at 8. At some point, the user may determine that a problem exists in the coding logic, syntax, or other aspect of the source code component, and decide to make changes or edits thereto. At 10, the user is allowed to edit the source code component to create an edited source code component, which is compiled at 12, for example, using a source compiler, in order to create an edited intermediate language component. The method 2 further comprises compiling the edited intermediate language component using an intermediate language compiler (e.g., such as a JIT compiler) at 14 to create an edited native code component and executing the edited native code component at 16 beginning at the first point, whereafter the method 2 ends at 18.

At 10, the user may perform a variety of edits not heretofore available. For instance, the user may edit the source code component by adding a new field to an object of a class. In this case, compiling the edited intermediate language component at 14 may comprise extending a field table associated with the object to accommodate the new field to create an extended field table (not shown), as illustrated and described in greater detail hereinafter with respect to FIGS. 14–19. In addition, where the edits include adding a new field to an object, the execution of the edited native code component at 16 may comprise employing the extended field table. The extension of the field table may advantageously comprise adding the new field via a synchronization block associated with the object, as illustrated and described below with respect to FIGS. 16–19, in order to create the extended field table. It will be noted at this point that the object may not have a field table per se, but instead may comprise a logical layout of storage based on the field table in the class itself.

In addition to adding new fields to an object of a class, a user may add a new method to a class at 10, such as a virtual method, in accordance with another aspect of the invention. In this regard, compiling the edited intermediate language component at 14 may comprise extending a virtual method table (not shown) associated with the program, in order to accommodate the new method, as illustrated and described below with respect to FIGS. 11–13. The extended virtual method table may then be employed in executing the edited native code component at 16. The extended virtual method table may comprise first and second memory portions, wherein creation of the extended virtual method table may comprise providing a reference to the new method in the second memory portion. As illustrated and described further hereinafter, the extension of virtual method tables may be done by any appropriate technique, for example, including providing extra memory space (e.g., memory 'slots') at the end of such tables, or utilizing one or more slots at some arbitrary memory location following the table, or combinations thereof.

For instance, in one implementation, 2 extra slots may be provided at the end of the virtual method tables, and an attempt is initially made to allocate a slot at some arbitrary memory location following the table, not using any of the pre-allocated slots. Where a slot index is only 2 bytes, all the memory between the end of the table and the slot range may potentially be allocated already. In this case, the furthest pre-allocated slot that is available may be employed, so as to maximize the slot index, such that the system does not use up an earlier slot that another prior class might need. In this example, the allocation of extra memory with each virtual function table facilitates the ability to cope with the situation where allocation of memory after the table (e.g., at an arbitrary location) is unavailable or otherwise undesirable.

In this manner, the issue of whether the memory allocated for table extension is somewhere random or in some other table is irrelevant, and it may be unlikely that the slot in the table that is being extended would be used, in order to try to maximize the slot index. Thus, the invention may also advantageously provide for using non-contiguous memory spaces for the first and second memory portions of the extended virtual method, wherein extending the virtual method table comprises creating a call to the new method using a reference to the second memory portion.

Another aspect of the invention allows a user to edit the source code component at 10 by changing an existing method in the source code component, as illustrated and described below with respect to FIGS. 4–10. For instance, the user may add a new variable to the existing method, and/or may change an algorithm in the existing method. Where a new variable is added at 10, execution of the edited native code component at 16 may comprise substituting edited native code corresponding to the existing method upon a return to the method. In addition, the invention provides for determining a return to the method using a breakpoint. The user at 10 may also replace an existing method created in a first source language with a new method created in a second source language. The invention thus provides significant advantages in developing and/or debugging code in association with a common language runtime environment or system.

With respect to compiling the edited intermediate language component at 14 and executing the edited native code component at 16, another aspect of the invention provides for compiling the edited intermediate language component, and executing the edited native code component on an as-needed basis. Thus, for example, the execution may resume with execution of unedited portions of the native code component at 16, and compilation at 14 may be done selectively if and when a call to the edited portion of the native code is encountered in the program. Thus, the invention provides for selectively compiling the edited intermediate language component and executing the resulting edited portions of the resulting native code component as-needed, which may mitigate unnecessary compiling of edited components which are not subsequently employed in the execution of the program. Accordingly, a user at 10 may change a first source component associated with a first native component to create an edited first source component, wherein compiling the edited source code component at 12 comprises compiling the edited first source component using the source compiler to create an edited first intermediate language component. The edited first intermediate language component may then be selectively compiled at 14 to create an edited first native component on an as-needed basis, wherein executing the edited native code component at 16 comprises executing the edited first native component.

Figure 2:
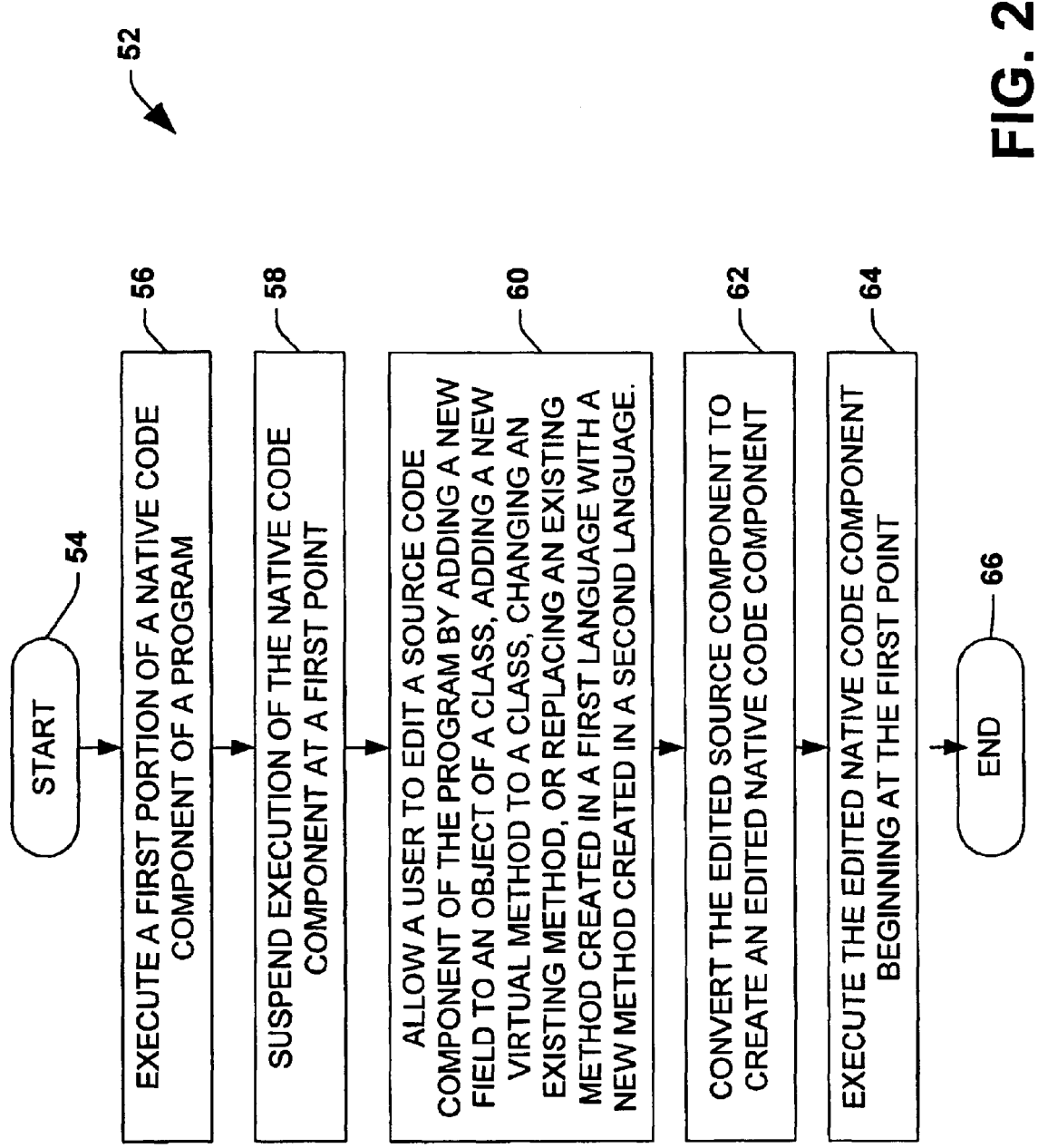
FIG. 2 is a flow diagram illustrating another exemplary method of editing a software program in accordance with the invention.

Referring now to FIG. 2, another aspect of the invention provides a method 52 for editing a software program having a source code component, and a native code component. The inventive method may be carried out in common language runtime environments as well as other development situations involving compiled code. While the exemplary method 52 is illustrated and described herein as a series of acts, it will be appreciated that the present invention is not limited by the illustrated ordering of acts, as some acts may occur in different orders and/or concurrently with other acts apart from that shown and described herein, in accordance with the invention. In addition, not all illustrated acts may be required to implement a methodology in accordance with the present invention. The method 52 may be employed in association with the exemplary common language runtime system illustrated and described in greater detail hereinafter with respect to FIG. 3. However, it will be appreciated that the exemplary method 52 may be implemented in association with the apparatus and systems illustrated and described herein as well as in association with other systems not illustrated.

Beginning at 54, the exemplary method 52 comprises executing a first portion of a native code component at 56 and suspending execution of the native code component at a first point at 58. For example, a user may execute native code at 6 corresponding to a single source code statement or instruction, or a range of such source code instructions, after which execution is suspended at 58. At some point, the user may decide to make changes or edits to the program. At 60, the user is allowed to edit the source code component to create an edited source code component, which is converted at 62, for example, using a compiler, in order to create an edited native code component. The method 52 further comprises executing the edited native code component at 64 beginning at the first point, after which the method 52 ends at 66.

At 60, the user may perform a variety of edits, such as adding a new field to an object of a class, adding a new method to a class, changing an existing method in the source code component, and/or replacing an existing method created in a first source language with a new method created in a second source language. Where the user adds a new field to an object of a class at 60, converting the edited source component at 62 may comprise extending a field table associated with the object to accommodate the new field in order to create an extended field table (not shown). In addition, where the edits at 60 include adding a new field to an object, the execution of the edited native code component at 64 may comprise employing the extended field table. The extension of the field table may advantageously comprise adding the new field via a synchronization block associated with the object, as illustrated and described below with respect to FIGS. 16–19, in order to create the extended field table.

The user at 60, alternatively or in combination, may add a new method to a class, such as a virtual method. If so, converting the edited source code component at 62 may comprise extending a virtual method table (not shown) associated with the program, in order to accommodate the new method. The extended virtual method table may then be employed in executing the edited native code component at 64. The extended virtual method table may comprise first and second memory portions, wherein creation of the extended virtual method table may comprise providing a reference to the new method in the second memory portion. In addition, the first and second memory portions may be non-contiguous, wherein extending the virtual method table comprises creating a call to the new method using a reference to the second memory portion. In this regard, as described above, the invention may be implemented in a manner where non-contiguous memory is utilized before usage of contiguous memory slots is attempted, for example, in order to attempt to maximize a slot index.

A user may also change an existing method in the source code component at 60, as illustrated and described below with respect to FIGS. 4–10. For example, the user may add a new variable to the existing method, and/or change an algorithm in the existing method. Where a new variable is added at 60, execution of the edited native code component at 64 may comprise substituting edited native code corresponding to the existing method upon a return to the method. In addition, the invention provides for determining a return to the method using a breakpoint. The user at 60 may also replace an existing method created in a first source language with a new method created in a second source language.

According to another aspect of the invention, the conversion and execution of 62 and 64 may be done on an as-needed basis. Thus, for example, the execution may resume with execution of unedited portions of the native code component at 64, and code conversion from source to native at 62 may be done selectively if and when a call to the edited portion of the program is encountered. In this manner, the invention provides for selectively converting the edited source code component and executing the resulting edited portions of the resulting native code component as-needed, which may mitigate unnecessary compiling of edited components which are not employed in the execution of the program. Accordingly, a user at 60 may change a first source component associated with a first native component to create an edited first source component, wherein converting the edited source code component at 62 comprises compiling the edited first source component using a source compiler to create an edited first native component on an as-needed basis, wherein executing the edited native code component at 64 comprises executing the edited first native component.

Figure 3:
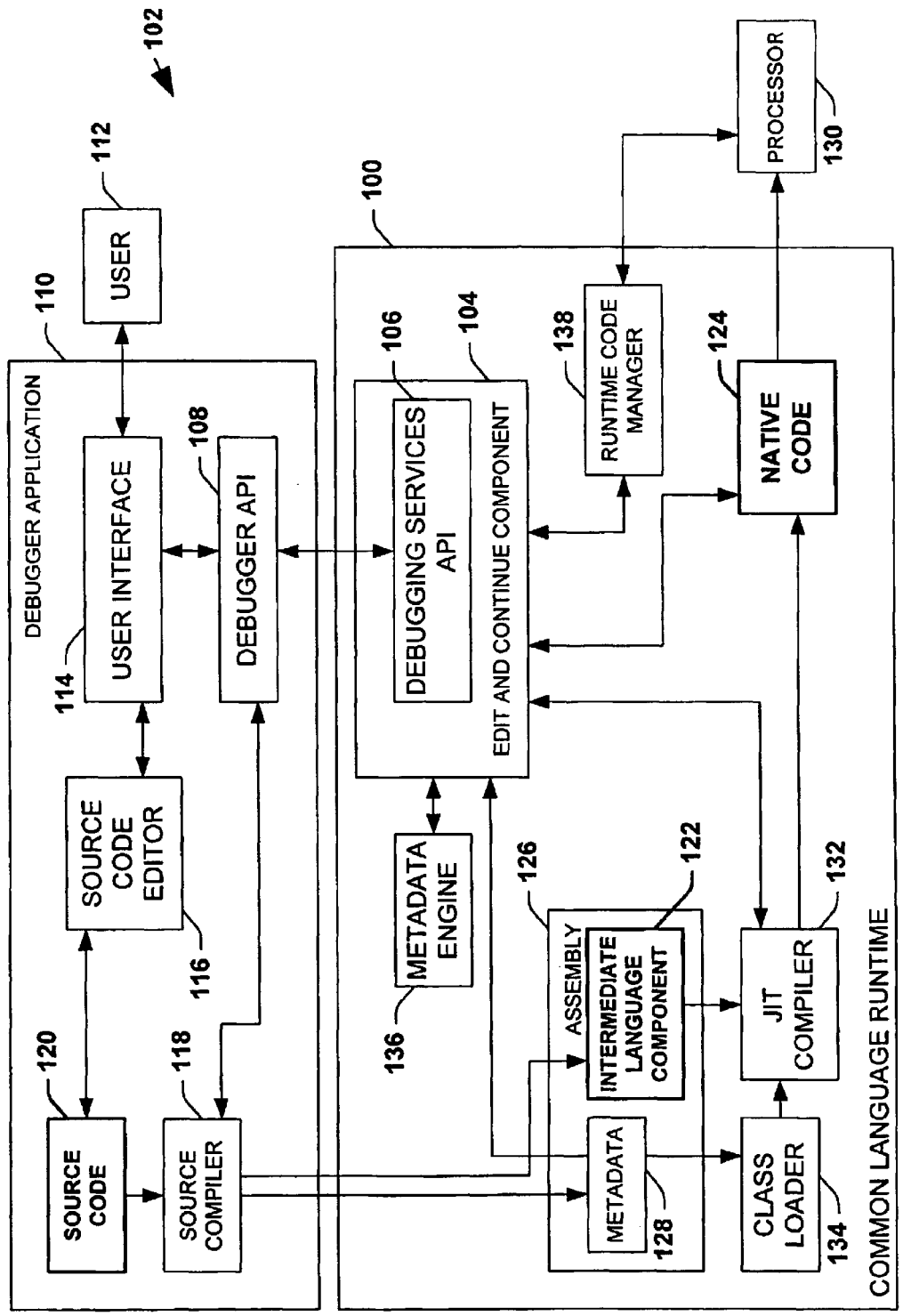
FIG. 3 is a schematic diagram illustrating an exemplary common language runtime system having an edit and continue component in accordance with another aspect of the invention.
Figure 4:
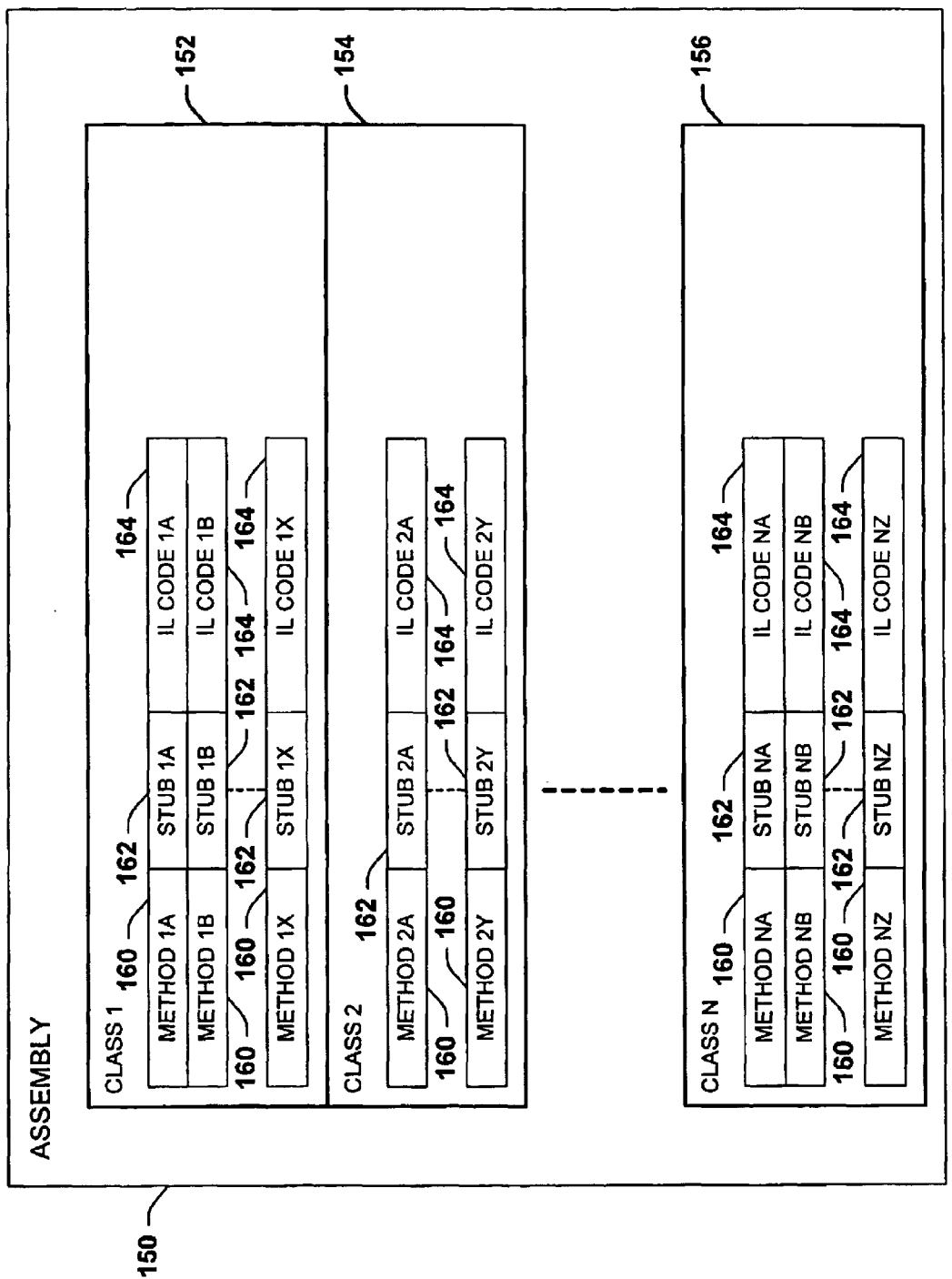
FIG. 4 is a schematic diagram illustrating an exemplary assembly in a common language runtime environment in accordance with the invention.
Figure 5:
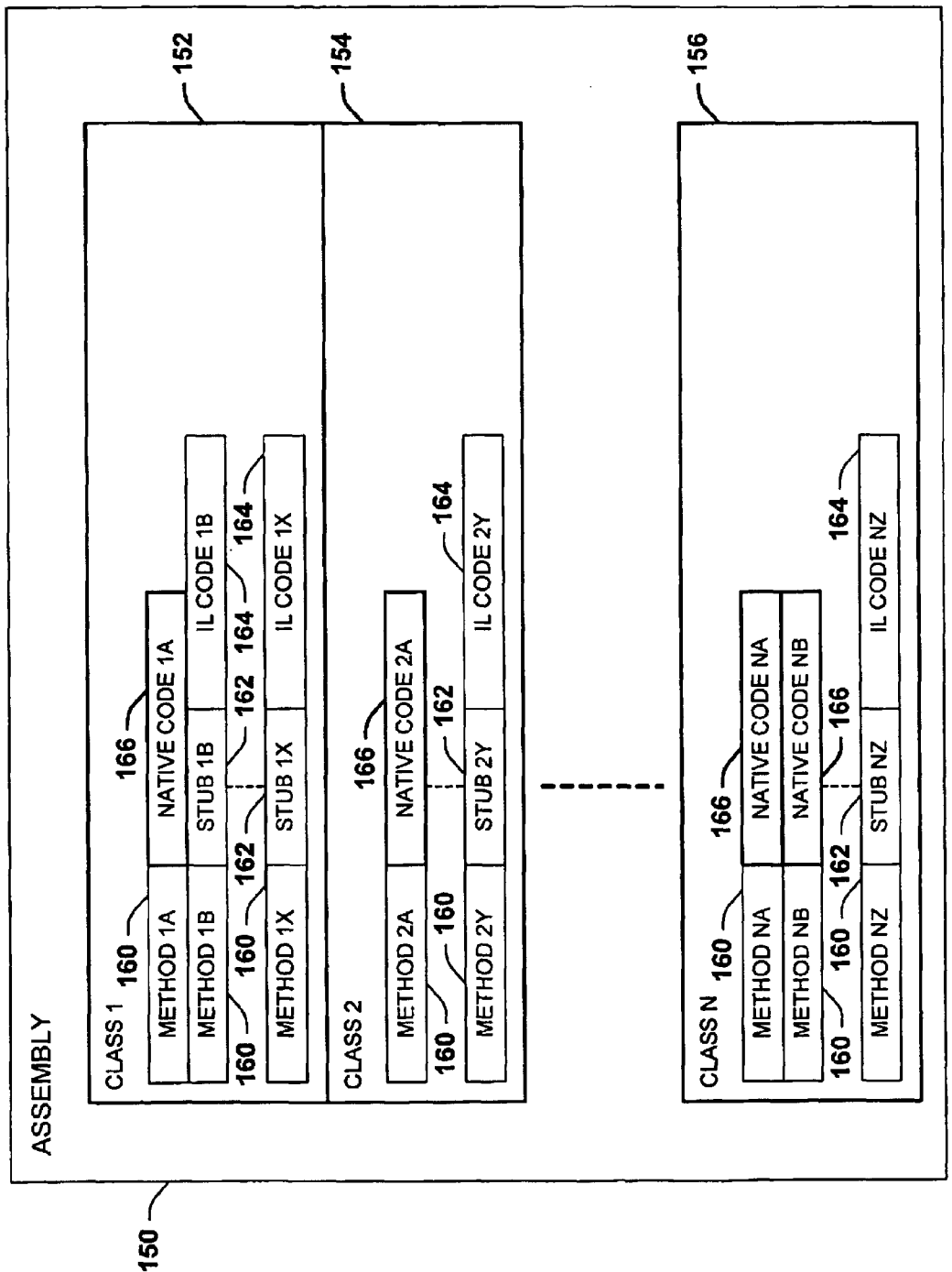
FIG. 5 is a schematic diagram further illustrating the assembly of FIG. 4.

Referring now to FIG. 3, another aspect of the invention provides a runtime system for executing a program in a computer system. The runtime system comprises an edit and continue component having a debugging services interface component interfacing with a debugger application, and an intermediate language compiler adapted to compile intermediate language code into native code. The edit and continue component executes a first portion of a native code component, suspends execution of the native code component at a first point, allows a user to edit the source code component using a debugger application to create an edited source code component, and compiles the edited source code component using a source compiler to create an edited intermediate language component. The edit and continue component further compiles the edited intermediate language component using the intermediate language compiler to create an edited native code component, and executes the edited native code component beginning at the first point.

An exemplary runtime system 100 is illustrated in FIG. 3 comprising an edit and continue component 104 having a debugging services interface or API component 106 interfacing with a debugger application 110, which interoperate to allow a user 112 to run, edit, and debug a software program in a computer system 102. The program may comprise a source code component 120 created or written in a source code language (e.g., Visual Basic, C++, C#, Java Script, APL, COBOL, Pascal, Eiffel, Haskell, ML, Oberon, Perl, Python, Scheme, Smalltalk, Objective Caml, and the like), an intermediate language (IL) component 122 (e.g., MSIL or the like), and a native code component 124, wherein the native code component 124 comprises instructions which may be executed or directly operated on by a processor 130 in the computer system 102.

The exemplary runtime system 100 further comprises an intermediate language compiler such as a just-in-time (JIT) compiler 132, which is operable to compile intermediate language code (e.g., IL component 122) into native code (e.g., native code component 124). The user 112 may create and/or edit the source code component 120 according to known software programming techniques and the specific logical and syntactical rules associated with a particular source language, via a user interface 114 and a source code editor 116 in the debugger application 110. Thereafter, the source code component 120 may be compiled via a source compiler 118, whereby an intermediate language representation of the program is created, such as an assembly 126. The assembly 126 comprises the intermediate language (IL) component 122 and metadata 128. It will be appreciated that the source compiler 118 may be included within, or separate from, the debugger application 110.

The IL component 122 comprises intermediate language instructions representative of functions, methods, variables, etc. associated with the software program, and the metadata 128 may include descriptions of types, classes, references to external assemblies, record version information such as author, and the like. The assembly 126 may be presented to the runtime system 100 by the source compiler 118 as a unit of deployment for execution and/or interactive debugging via the edit and continue component 104 in accordance with the invention. The debugger application 110 may interact with the runtime system 100 via a debugger interface or API 108, which interacts between the debugging services interface 106 of the edit and continue component 104 and the user interface 114 and source compiler 118 of the debugger application 110. The exemplary debugging services interface 106 handles registration for and notification of events in the running program, allowing the debugger application 110 to control execution thereof. For instance, the debugger application 110 may set and handle breakpoints, intercept exceptions, modify control flow, and examine or modify program state such as code and/or data. The edit and continue component 104 may utilize information from both the source compiler 118 (e.g., metadata 128) and the JIT compiler 132.

The exemplary assembly 126 may be provided to the runtime system 100 in the form of a file, such as a .exe or a .dll file, which comprises the IL component 122 and the metadata 128. The runtime system 100 may load the assembly 126 or portions thereof into memory for JIT compilation and execution via a class loader component 134, which may load classes or types within the assembly 126 on a class-by-class basis, wherein the associated IL code for a class (e.g., from the IL component 122) and the associated metadata for the class or type (e.g., from the metadata component 128) are loaded into memory as the class or type is needed. When further classes or types are encountered in the execution of the program, the class loader 134 is again used to load the new class or type, if the desired class or type is in the assembly 126. Where an external class or type is referenced (e.g., not within the assembly 126), an assembly resolver (not shown) locates the desired type, and provides it to the class loader 134.

Once a class or type has been loaded by the class loader, the class may be provided to a verifier (not shown) to verify whether the IL code (e.g., IL component 122) is typesafe in order to protect the code from unauthorized access. The verifier may accordingly check to see that the metadata 128 is well-formed, and may perform control flow analysis to determine whether structural and behavioral conditions are met. The JIT compiler 132 then compiles or converts the IL code (e.g., from IL component 122) into corresponding native code (e.g., native code component 124) on a method-by-method basis, as illustrated and described in greater detail hereinafter with respect to FIGS. 4–10. The edit and continue component 104 may perform dynamic stack operations for implementing the various features and aspects of the invention, some of which may be facilitated by the method-by-method compilation of the IL code component 122. The edit and continue component 104 may further interface with a metadata engine 136 and a runtime code manager 138 for loading and operating on the assembly 126 and execution thereof in the runtime system 100.

The class loader 134 may load the IL code associated with the methods of a particular class, and the first time a particular method is to be executed, the JIT compiler 132 compiles the IL code (e.g., from the IL component 122) for the method into native code (e.g., in the native code component 124). The compiled code may be stored in memory in the location from which the associated IL code was obtained by the JIT compiler 132. In another implementation, the compiled code need not replace the IL code, for example, wherein the compiled code is stored at independent addresses. Thus, the IL component 122 and native code component 124 may, but need not, be interleaved in memory at a given point in the execution of the program. For instance, when a method is executed for a particular type or class in the system 100, a determination is made as to whether the method has been previously executed. If not, a stub associated with the IL code for the method is executed, which in turn launches the JIT compiler 132 to convert the IL code for the method into native code. The stub (e.g., and the associated IL code) may then be overwritten in memory with the native code for the method from the JIT compiler 132.

In one mode of operation, the compiled native code is not persisted to disk, but instead resides in runtime system memory. However, the system 100 may operate in other modes in which an install time compilation of native code is performed, wherein the resulting native code may be persisted to disk along with the associated IL code for a particular software program. In this regard, the runtime system and the edit and continue component 104 may advantageously determine whether externally referenced assemblies are encountered which have changed. In this case, the edit and continue component of the runtime system 100 may discard the native code (e.g., the native code loaded and JIT compiled at install time), and use the changed IL code (e.g., via JIT compiling) as needed on a method-by-method basis.

Referring also to FIGS. 4–10, another exemplary assembly 150 is illustrated having an integer number N classes, such as class 1 152, class 2 154, and class N 156. Each class includes one or more methods having a method identifier 160, a stub 162, and associated IL code 164. For example, class 152 includes an integer number X methods, class 154 comprises an integer number Y methods, and the Nth class 156 comprises an integer number Z methods. As various methods within the classes 150, 152, and/or 156 are encountered during program execution, the associated stubs and IL code may be replaced or overwritten in memory with the associated native code emitted by the JIT compiler 132. The stubs may be created at runtime by an execution engine, and need not be stored with the method. For example, initially a method address in the virtual table points to a stub which calls a pre-stub (not shown). The pre-stub compiles the IL to native code, and updates the stub to call the native code rather than the pre-stub. Where edit and continue functionality is not being employed, the actual virtual table entry can also be updated to point to the IL address. For example, referring to FIG. 5, the stubs 162 and IL code 164 corresponding with methods 1A, 2A, NA, and NB have been overwritten with corresponding native code 166. At the point in the program execution illustrated in FIG. 5, the methods 1A, 2A, NA, and NB have been encountered, and have been JIT compiled into native code components 166. Subsequent calls (e.g., or returns) to these methods result in the execution of the native code components 166 in the processor 130.

The user 112 may proceed with program execution in the runtime system 100 via the debugger application 110, and the edit and continue component 104, until the user 112 decides to make edits or changes to the program. The execution may proceed via single stepping through the source code 120 (e.g., one source code line at a time), by executing a range of source code (e.g., several source code lines or instructions at a time), or the user may stop execution via the user interface 114 at any point during continuous execution. Once the execution of the program is suspended or stopped, the edit and continue component 104 allows the user 112 to edit the source code component (e.g., source code component 120 of FIG. 3), for instance, using the source code editor 116 of the debugger application 110 to create an edited source code component. When the desired edits have been completed, the edit and continue component 104 compiles the edited source code component via the interfaces 106 and 108, using the source compiler 118, in order to create an edited intermediate language component.

Figure 6:
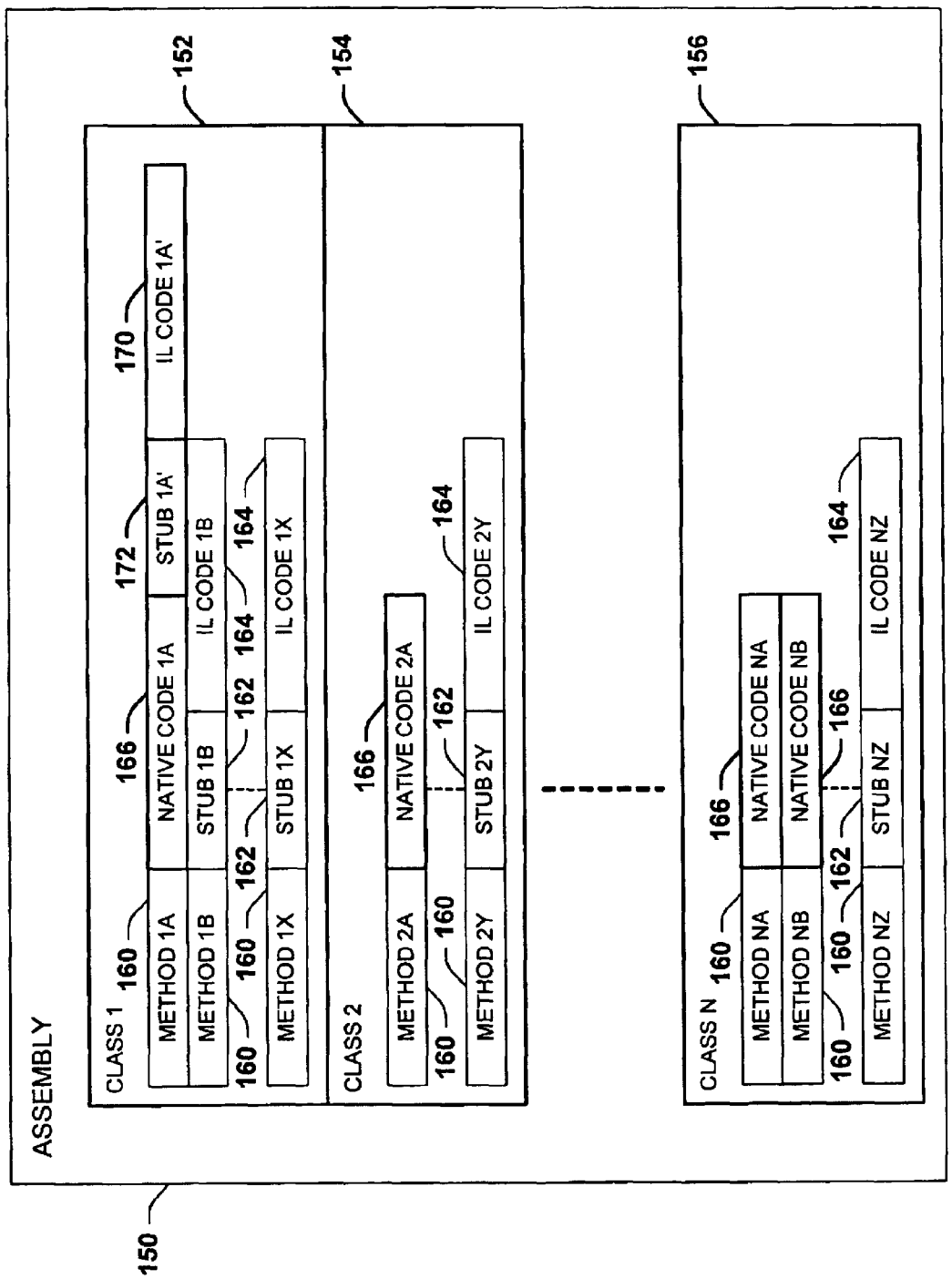
FIG. 6 is a schematic diagram further illustrating the assembly of FIGS. 4–5.
Figure 7:
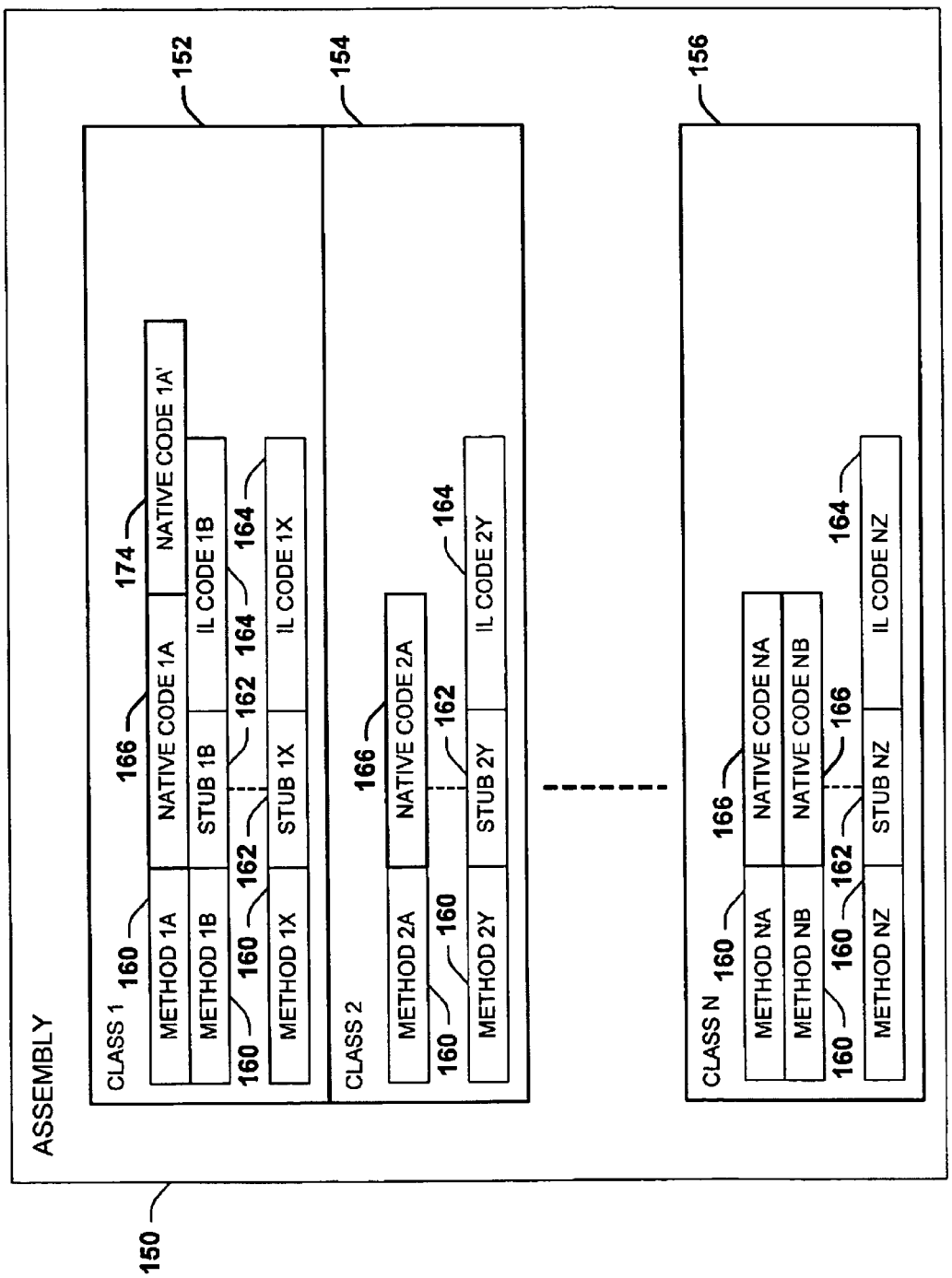
FIG. 7 is a schematic diagram further illustrating the assembly of FIGS. 4–6.

Referring also to FIG. 6, for example, the user 112 may edit the source code corresponding with method 1A of class 152. The source compiler 118 generates IL code 170 and new metadata (not shown) corresponding to the edited source code for method 1A, and the loader 134 generates a stub 172 for the method 1A when the IL code is loaded. The class loader 134 loads the IL code 170 and stub 172 into the assembly 150. Execution of the program may thereafter be continued by the edit and continue component 104 from the point where execution was suspended, for example, via a user command in the user interface 114. Referring also to FIG. 7, when the edit and continue component 104 determines that the edited method 1A is needed again (e.g., a new call to method 1A or a return thereto), the edited intermediate language component 170 is compiled using the intermediate language (JIT) compiler 132 to create an edited native code component 174, which may overwrite or replace the corresponding IL code 170 and stub 172 in the assembly 150.

Figure 8:
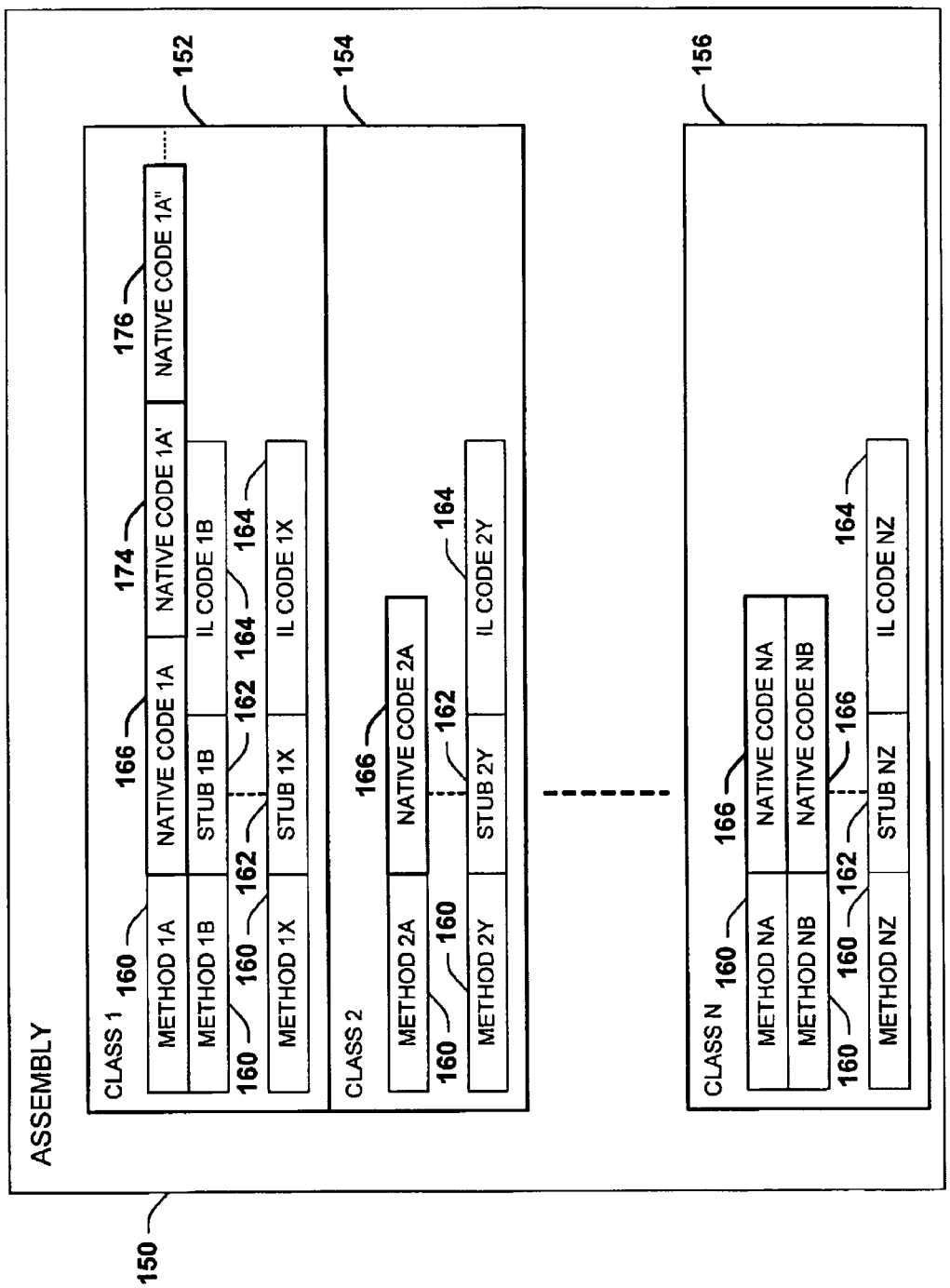
FIG. 8 is a schematic diagram further illustrating the assembly of FIGS. 4–7.

The edited native code component 174 may then be executed as needed in the runtime system 100. The edit and continue component 104 may thereafter suspend execution of the program, and allow the user 112 to make further edits, for example, to method 1A. As illustrated in FIG. 8, the twice edited source code (not shown) for the method 1A may then be source compiled into IL code (not shown) by the source compiler 118, and JIT compiled into a further edited native code component 176, in the manner described above. The edit and continue component thus allows a user 112 to edit the source code any number of times, and to continue running the program from the point where execution left off. It will be appreciated that in the exemplary common language runtime system 100, the IL code components (e.g., IL code 170 of FIG. 6) are advantageously JIT compiled into native code (e.g., edited native code component 174) on an as-needed basis. However, those skilled in the art will appreciate that the invention contemplates such compilation or conversion into native code upon completion of editing, and other variants, and that the invention is not limited to as-needed code conversion.

In this regard, it will be further appreciated that where as-needed code conversion is employed, the resumed program execution may, but need not, include subsequent execution of (e.g., calls to or returns to) an edited method. For instance, the edited method 1A may be source compiled into the edited IL component 170 (e.g., and associated stub 172), which are loaded into the assembly 150, as illustrated in FIG. 6. Where no further references to the method 1A occur in subsequent program execution, the edit and continue component may, but need not, JIT compile the edited intermediate language component 170 into native code, in accordance with the invention.

Figure 9:
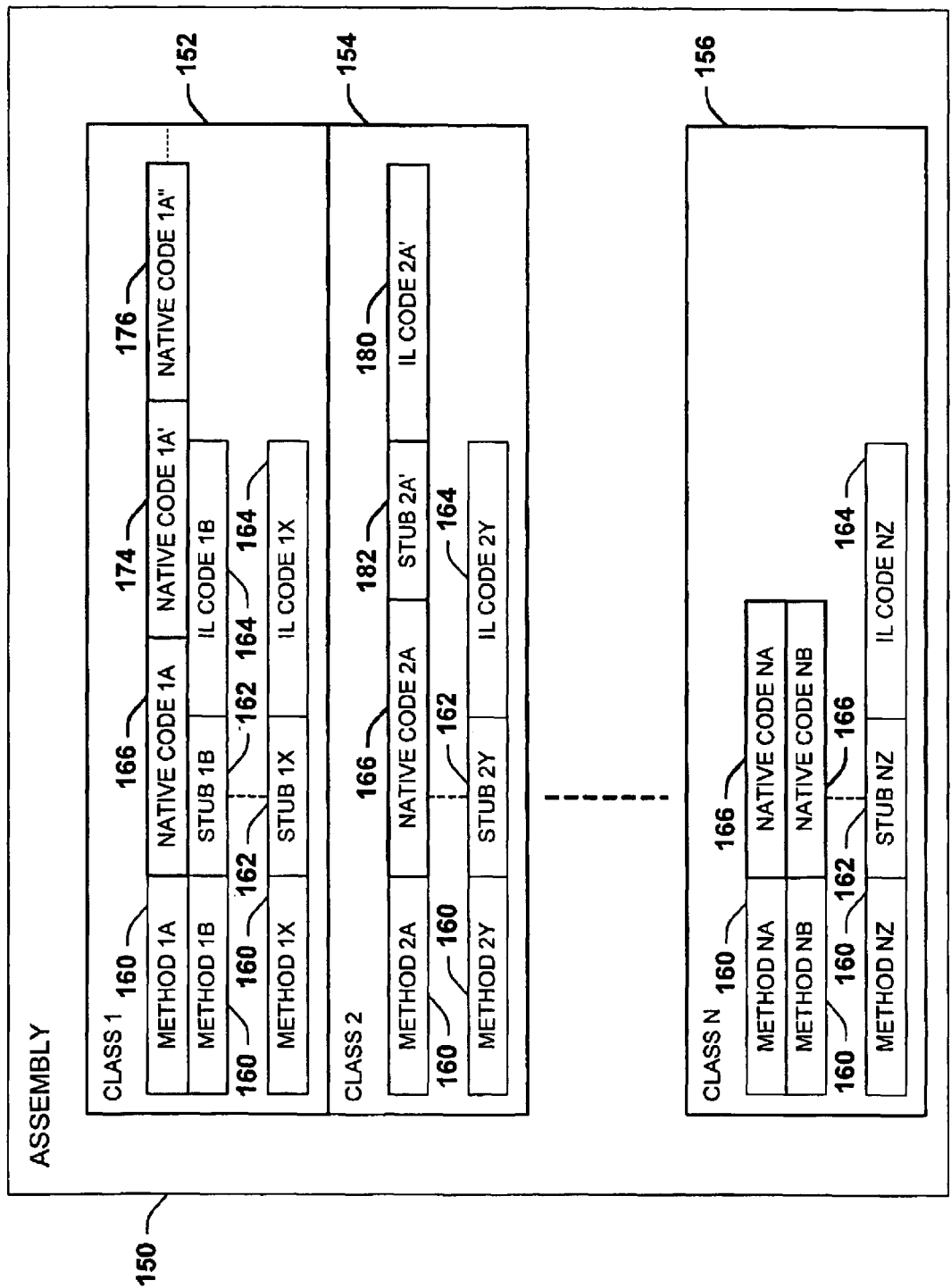
FIG. 9 is a schematic diagram further illustrating the assembly of FIGS. 4–8.
Figure 10:
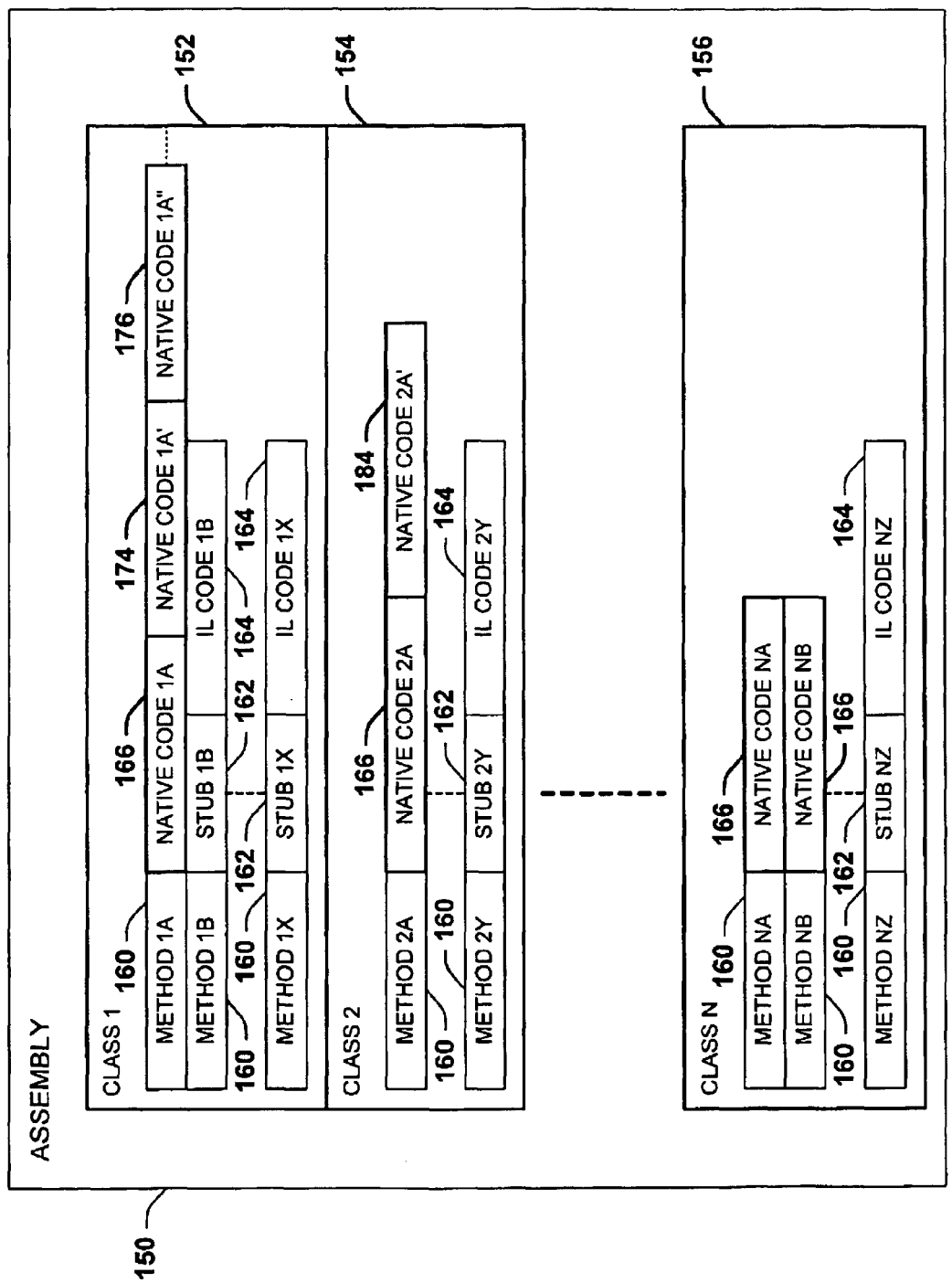
FIG. 10 is a schematic diagram further illustrating the assembly of FIGS. 4–9.

Referring also to FIG. 9, the user may again suspend program execution via the edit and continue component 104, and edit another method 2A. The edit and continue component 104 then compiles the edited source code corresponding to method 2A into an edited intermediate language component 180 and a stub 182, which is loaded into the assembly 150 as illustrated in FIG. 9. Program execution may thereafter continue from the point where it was suspended, as described above. Referring also to FIG. 10, where the subsequent program execution refers to the edited method 2A, the edit and continue component 104 may employ the JIT compiler 132 (e.g., via the stub 182) to compile the edited IL code component 180 into a corresponding native code component 184, which may then be used in the program execution in the processor 130.

The edit and continue component 104 of the runtime system 100 may thus be employed to change an existing method of a class. For example, the user 112 may add a new variable to the existing method, and/or to change an algorithm or function in the existing method. In this regard, the edit and continue component 104 may substitute edited native code (e.g., edited native code component 174 of FIG. 7) corresponding to the existing method (e.g., method 1A) upon a return to the method, which return may be determined via a breakpoint. In addition, the edit and continue component (e.g., as well as the debugger application 110) may interact with more than one source code compiler (e.g., source compiler 118), whereby the edit and continue component 104 allows the user 112 to replace an existing method created in a first source language with a new method created in a second source language (e.g., Visual Basic, C++, C#, Java Script, APL, COBOL, Pascal, Eiffel, Haskell, ML, Oberon, Perl, Python, Scheme, Smalltalk, Objective Caml, and the like).

Referring now to FIGS. 3 and 11–13, the exemplary edit and continue component 104 of the common language runtime system 104 may further allow the user 112 to add a new method to a class, wherein the new method may be a virtual method. The edit and continue component 104 may extend a virtual method table associated with the program to accommodate the new method to create an extended virtual method table. The extended virtual method table may comprise first and second contiguous or non-contiguous memory portions, where the edit and continue component 104 provides a reference to the new method in the second memory portion. In this regard, the invention may be implement by any appropriate table extension technique (e.g., using contiguous and/or non-contiguous memory locations), for example, wherein an attempt is made to add a new method in a non-contiguous memory location, which may be selected randomly, and employing a pre-allocated slot for such new method where non-allocated slots are unavailable within a memory index range.

Figure 11:
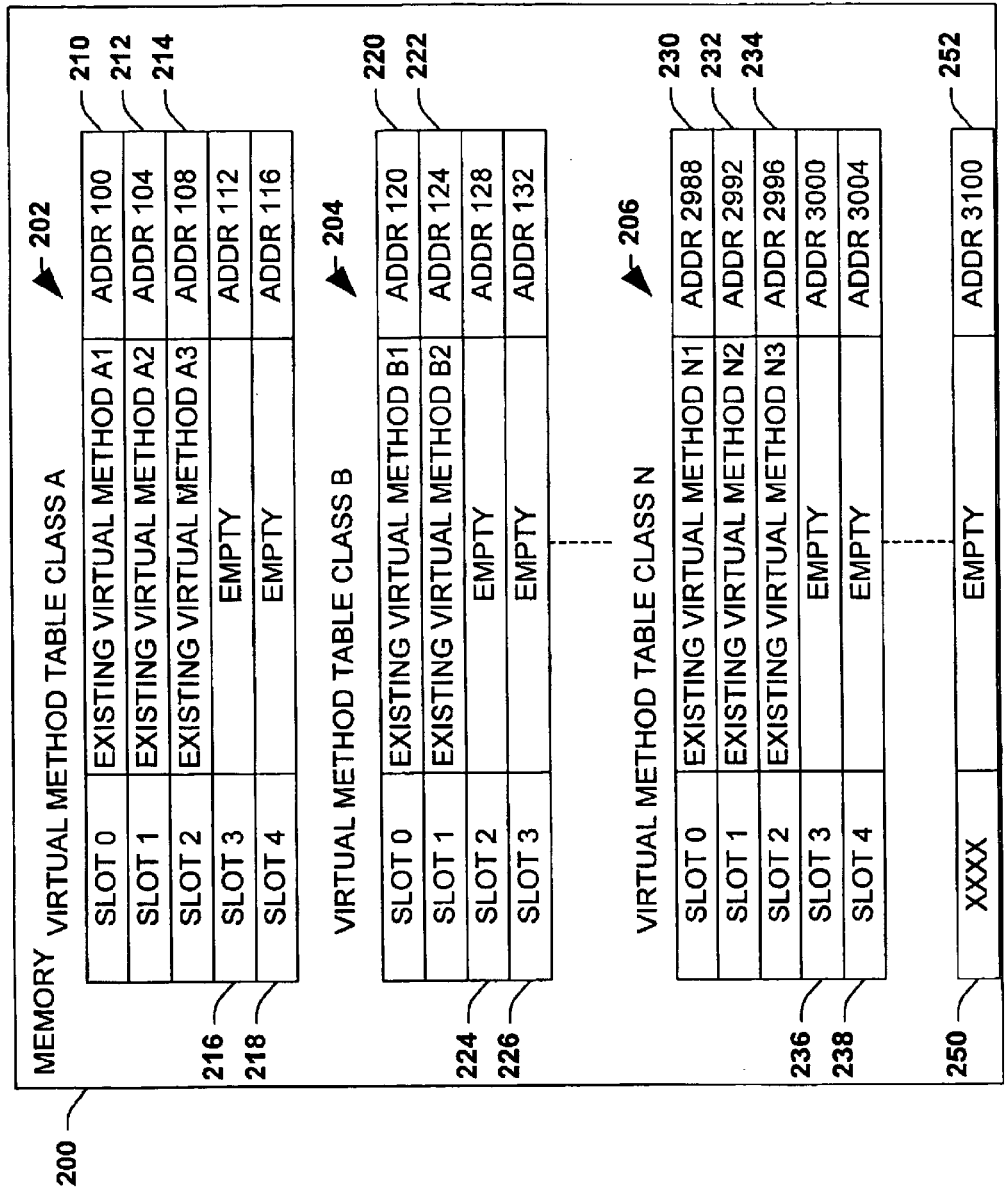
FIG. 11 is a schematic diagram illustrating a portion of memory in an exemplary common language runtime system having an exemplary virtual method table.
Figure 12:
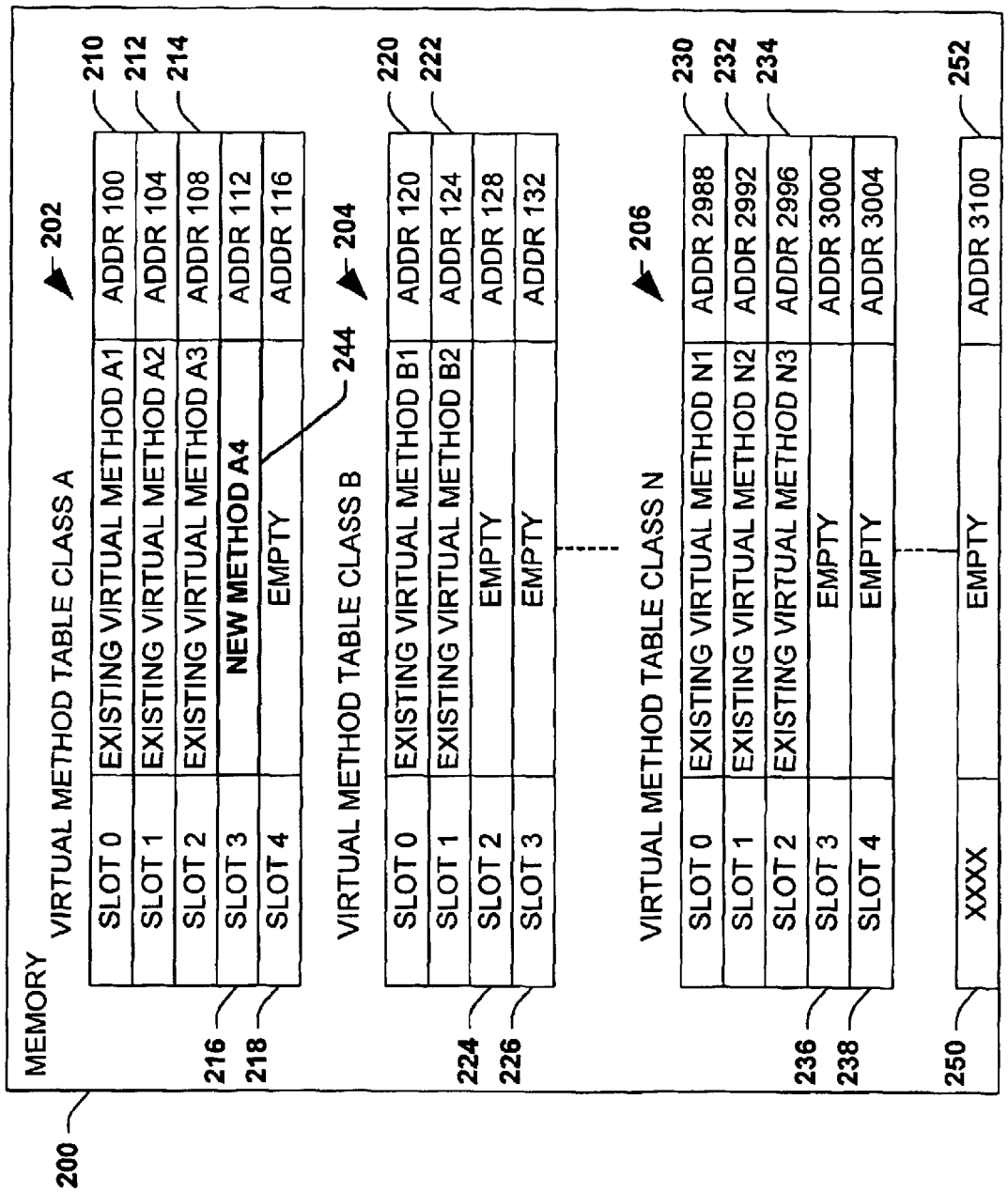
FIG. 12 is a schematic diagram further illustrating the virtual method table of FIG. 11.
Figure 13:
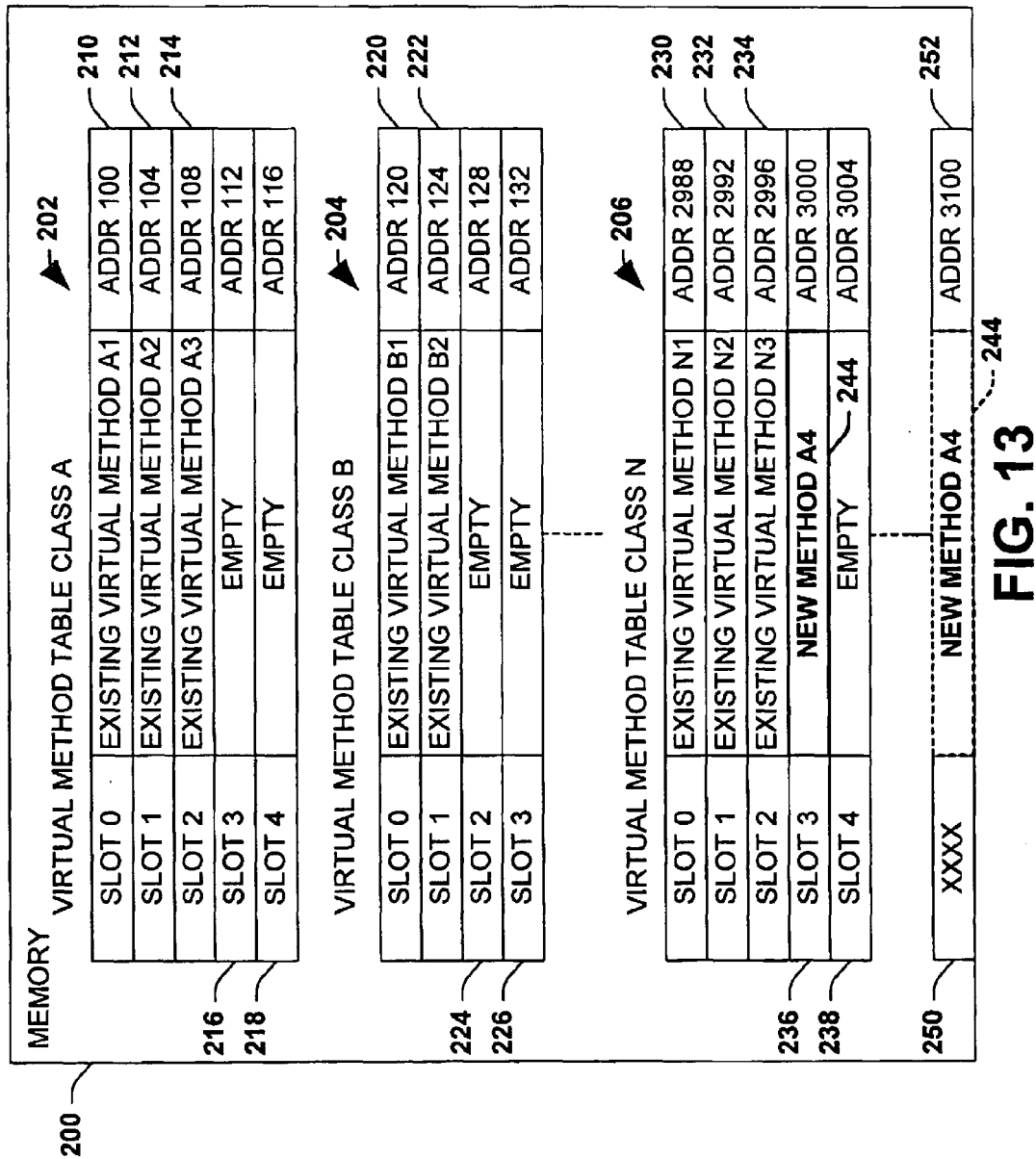
FIG. 13 is a schematic diagram further illustrating the virtual method table of FIGS. 11–12.

In order to further illustrate various aspects of the invention, FIGS. 11–13 illustrate an exemplary set of virtual method or virtual function tables 202, 204, and 206, in memory 200. The memory 200 may comprise an integer number N of such virtual method tables 202, 204, and 206, wherein each such table corresponds with an associated type or class in an assembly (e.g., assembly 126 of FIG. 3). Alternatively, the invention may be employed to operate on a single virtual method table having entries for all methods in a plurality of classes. In the exemplary table set of FIG. 11, the tables 202, 204, and 206 include entries for existing virtual methods in the corresponding classes A, B, and N, wherein class A includes three virtual methods, class B includes two such virtual methods, and class N includes three virtual methods. The memory 200 further comprises one or more memory locations or slots outside of the virtual tables 202, 204, and 206, such as slot location 252 at address 3100 252.

The virtual methods each occupy a slot in the tables 202, 204, and 206, which are numbered for illustration, from slot 0 210 of virtual table 202 at address 100 to slot 4 238 of virtual table 206 at address 3004, wherein each such slot occupies four bytes of space in the memory 200. The slot numbers may be used as tokens by the JIT compiler 132 to provide calling references or pointers to the virtual methods, for example, wherein the slot numbers start at 0 within each table 202, 204, and 206. For example, a pointer may exist in the runtime system 100 to provide an offset into the virtual method tables at address 100, and a call to a particular slot number or token in the IL code may be translated by the JIT compiler 132 into a pointer to the corresponding address in the memory 200 (e.g., actual memory address=(slot 0 address)+(slot number*slot size), for instance, where the slot size on a 32-bit system is 4 bytes, but could be different on a 64-bit system).

The virtual method tables 202, 204, through 206 may occupy contiguous portions or addresses of the memory 200, whereby the end of table 202 (e.g., slot 4 at address 116) immediately precedes the first entry (e.g., slot 5 at address 120) in the table 204. However, it will be appreciated that the invention finds application in association with memory and virtual table systems wherein the tables for virtual methods of different classes are stored in non-contiguous fashion. The memory 200 may thus comprise entries for virtual functions A1, A2, A3, B1, B2, N1, N2, and N3 at slot locations 210, 212, 214, 220, 222, 230, 232, and 234, respectively. In addition, the exemplary system of FIGS. 11–13 includes empty slot locations 216 and 218 of table 202, locations 224 and 226 of table 204, and locations 236, and 238 of table 206, in addition to the non-contiguous empty slot 250 at address 252.

The exemplary edit and continue component 104 may extend a virtual method table (e.g., table 202, 204, and/or 206) associated with a program to accommodate a new method added by the user 112, in order to create an extended virtual method table. For example, as illustrated in FIG. 12, a new method A4 244 may be added to class A, wherein the user 112 adds the method 244 via the source code editor 116 in the debugger application 110. Source compiler 118 may describe the tables 202, 204, and 206 via the created metadata 128, wherein the class loader 134 may create the tables 202, 204, and 206, as the classes A, B, and N are loaded, respectively, according to the metadata 128.

The edit and continue component 104 may employ the source compiler 118 in compiling edited source code, to emit new metadata associated with the edited source code component, from which the edit and continue component 104 may extend one or more of the virtual method tables 202, 204, and/or 206 in the memory 200, in accordance with the invention. In this regard, the edit and continue component 104 may employ the metadata engine 136 to provide the existing metadata 128 (e.g., associated with the unedited program) to the source compiler 118. The compiler 118, in turn, may perform a full or partial compilation of the entire edited source code, or of the edited portion thereof, and accordingly emit new metadata and associated edited intermediate language code (e.g., full or partial, depending on whether the source compiler 118 is adapted to perform partial or incremental compilation). Upon loading the edited class with which the new method is associated, the class loader 134 may be employed by the edit and continue component 104 to extend the class virtual method table 202 to include the new method 244.

In one implementation of the invention, the edit and continue component 104 may provide the debugger application 110 with a copy of the existing (e.g., unedited) metadata 128, for example, via the metadata engine 136. The debugger interface 108 may then provide this existing metadata 128 to the source compiler 118. The source compiler 118 may be adapted to then begin compiling the edited source code component using the existing metadata. The source compiler may, in turn, initialize the metadata engine 136 with the existing metadata, and perform a normal compilation thereafter, emitting only the new metadata, the new intermediate language component, and a delta log (not shown).

The new metadata and the existing metadata 128 may include associated unique identifiers (UIDs) to assist the edit and continue component 104 in identifying the new metadata as such, as opposed to treating the new metadata as a whole new program. The delta log may then be employed by the edit and continue component 104 in order to selectively perform loading and JIT compile operations (e.g., via the class loader 134 and the JIT compiler 132) on an as-needed basis. In this regard, the log can be advantageously employed in order to setup the environment with the new information, while only having to look at those items that have changed, and need not affect selective loading and JIT compilation. The employment of existing metadata in the compilation of edited source code may advantageously reduce the amount of work involved in creating source compilers (e.g., source compiler 118) adaptable to interact with the common language runtime system 100, or in adapting existing source compilers for such interaction.

As illustrated in FIG. 12, the new method 244 may be added to slot 216 at memory address 112 in the memory 200. If and when the new method 244 is called in subsequent execution of the program, the edit and continue component 104 may employ the JIT compiler 132 to create native code for the new method 244 as well as for the code which calls the method 244, wherein the calling native code may include a reference to method 244 using slot location or token 3 as the referenced to address 112. The invention thus provides for extending the virtual method table 202 by adding the new method 244 in a contiguous address with the existing methods A1, A2, and A3. Alternatively or in combination, the new method 244 may be added in a non-contiguous portion of the memory 200, which may, but need not be, an empty location within a virtual table, as illustrated in FIG. 13. For example, the new method 244 may be added in slot location 236 beginning at address 3000. Thus, the extended method table 202 may comprise first and second contiguous or non-contiguous memory portions (e.g., slot numbers or tokens 0–3, and slot 3 236 of table 206), where the edit and continue component 104 provides a reference to the new method 244 in the second memory portion at slot 3 236 of table 206, wherein the calling native code may include a reference to the new method 244 using slot location 236 as the referenced to address 3000. Other implementations are possible within the scope of the invention, for example, wherein the new method 244 may be added to the memory 200 at slot 250 (e.g., not a part of any existing virtual table 202, 204, or 206) at address 3100 252 (e.g., as illustrated in dashed line in FIG. 13), where such non-contiguous location is available for such use in the memory 200.

The invention contemplates other forms of indexing and mapping, whereby the virtual method tables 202, 204, and/or 206 may be extended to accommodate new functions. The edit and continue component 104, moreover, may interact with the class loader 134 and JIT compiler 132 in order to provide empty slot locations (e.g., locations 216, 218, 224, 226, 236, and/or 238) such that these slot locations are available for addition of new methods, as the user 112 edits the program. The edit and continue component 104 may accordingly determine the availability and location of such empty slots in extending one or more of the virtual method tables 202, 204, and/or 206 as the user adds new functions or methods to the program. It will be appreciated that the ability to extend the method tables 202, 204, and/or 206 for addition of new methods (e.g., new method 244) without relocating the existing methods 210, 212, 214, 220, 222, 230, 232, or 234, may advantageously facilitate the addition of new methods, without the need for tracking the relocation of existing methods. This provides for speedy resumption of code execution after the user 112 has modified the program, with all references to existing methods intact in the suspended code and the results related thereto. In addition, the provision of empty slot locations may, but need not, be done at the end of a particular virtual method table (e.g., such as slot 250 of FIG. 13), wherein any available (e.g., previously empty or unused) memory location may be employed for the new method 244, wherein appropriate references thereto may be provided by the edit and continue component 104.

Figure 14:
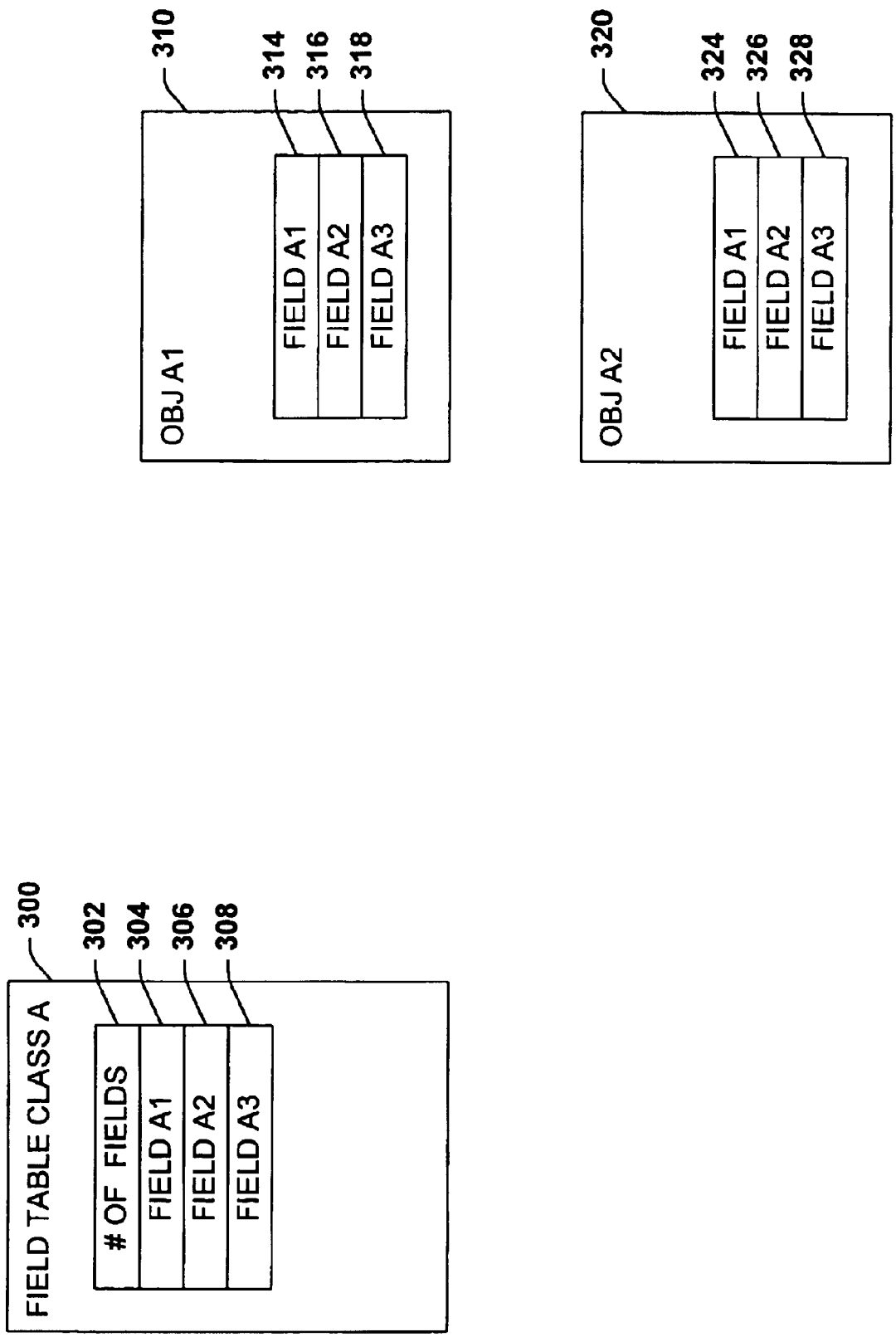
FIG. 14 is a schematic diagram illustrating exemplary field tables for a class and objects in the class in a common language runtime system.

Referring now to FIGS. 14–19, the invention further provides for allowing the user 112 to add a new field to an object of a class. In this regard, the edit and continue component 104 may extend a field table associated with the object to accommodate the new field to create an extended field table. As illustrated and described below, the edit and continue component 104 may advantageously add the new field via a synchronization block associated with the object to create the extended field table. As illustrated in FIG. 14, the edit and continue component 104 may employ the class loader 134 to create a field table 300 at class or type load time (e.g., using the metadata 128), wherein the field table 300 for class A comprises an entry 302 for the number of fields, and entries 304, 306, and 308 for the various fields A1, A2, and A3, respectively, of the class A.

Figure 15:
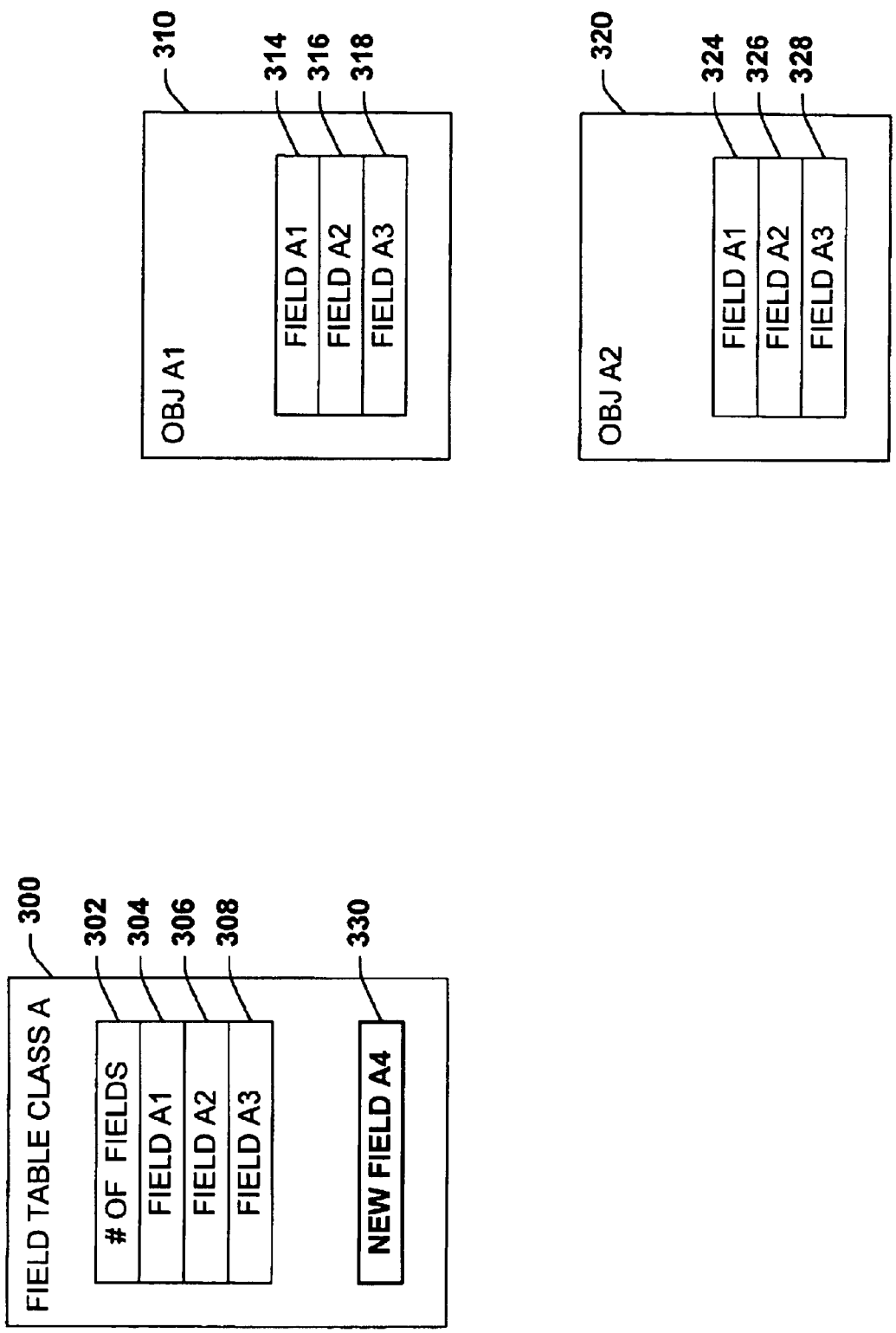
FIG. 15 is a schematic diagram further illustrating the field tables of FIG. 14.

As new instances of the class A (e.g., objects), such as objects A1 and A2 are created by the program, corresponding objects 310 and 320, respectively, may be created in memory of the runtime system 100. The objects 310 and 320 include entries 314, 316, and 318, and 324, 326, and 328, respectively, for the various fields A1, A2, and A3, respectively, of the class A. Referring also to FIG. 15, the edit and continue component 104 may suspend execution of the program and allow the user 112 to modify the associated source code component 120 by adding a new field A4 to the class A. An entry 330 corresponding to the new field A4 may accordingly be added to the class A field table 300, for example, by extending the table 300.

Figure 16:
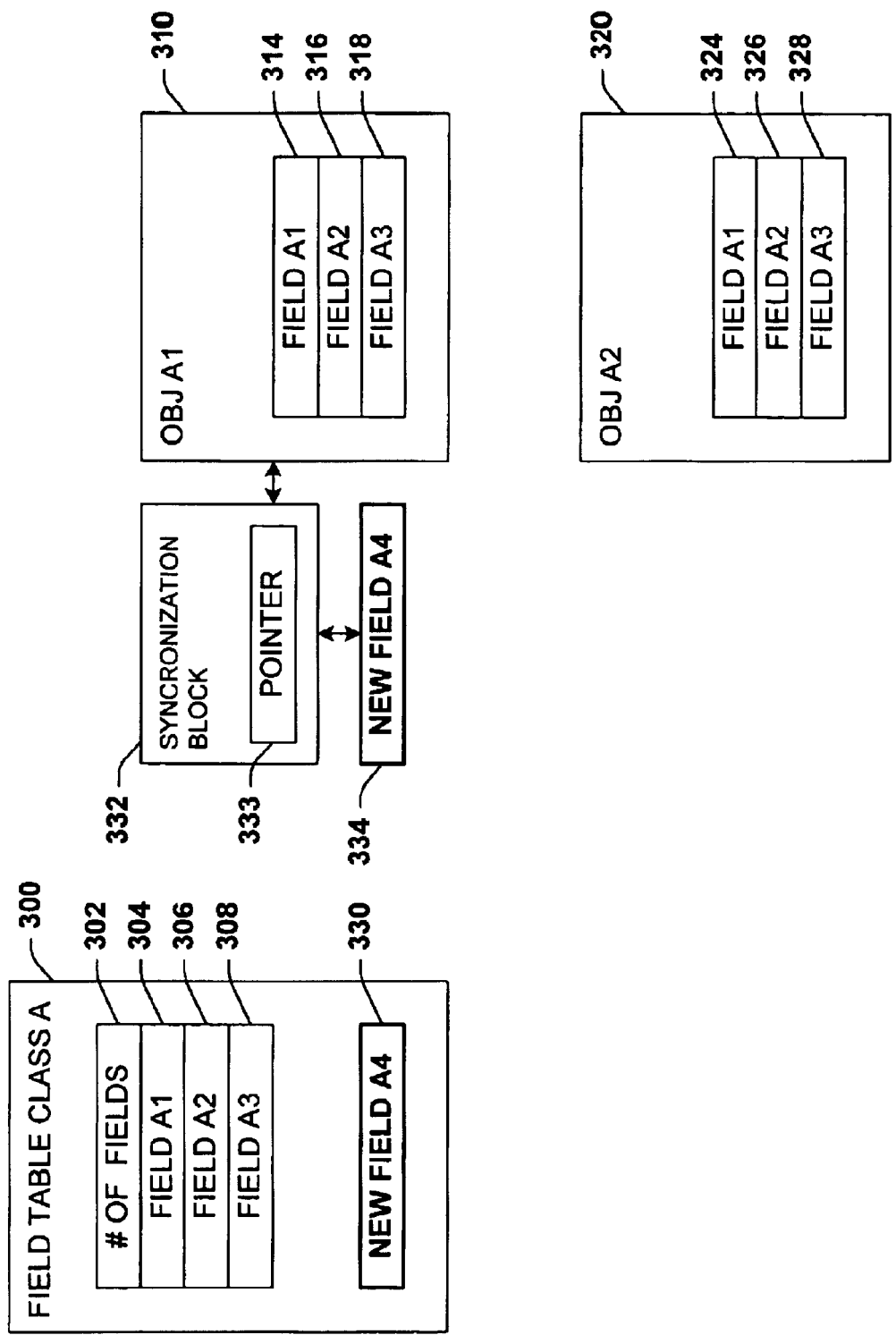
FIG. 16 is a schematic diagram further illustrating the field tables of FIGS. 14–15.

Referring also to FIG. 16, when subsequent program execution via the edit and continue component 104 encounters a reference to the new field A4 in association with an existing object of class A, the object may be updated with the new field A4. For example, object A1 may be accessed with reference to the new field A4 (e.g., via a call). The invention provides for extending the object 310 to accommodate the new field A4, wherein executing the edited native code component may include employing the added field. The object 310 may be extended, for example, using a synchronization block 332. associated with the object 310, such that a reference 334 to the new field A4 need not be located in contiguous memory with the rest of the object 310.

Access to an instance field entry (e.g., entries 314, 316, and/or 318 of object 310) may be accomplished via adding a fixed offset to a memory address associated with the object 310. However, it will be appreciated that the extension of object 310 to accommodate new fields (e.g., field A4) via the edit and continue component 104 may result in the object 310 having two or more non-contiguous portions. For instance, the pre-existing entries 314, 316, and 318 may occupy a first portion in the memory of the runtime system 100, whereas the newly added entry 334 in the object 310 for the new field A4 may reside in a second (e.g., non-contiguous) portion thereof. The invention may further allow for selective employment of instance field entry access via inline address arithmetic (e.g., by adding an offset to the memory address associated with the object 310) for access to the pre-existing fields A1, A2, and/or A3, and other access techniques for accessing the newly added field A4.

For example, one or more helper functions (not shown) may be employed to access the new field A4 associated with the extended field object 310, using the synchronization block 332, wherein the helper function obtains a pointer 333 from the synchronization block 332. A header (not shown) in the extended object 310 may include a pointer to the synchronization block 332. The pointer 333 in the synchronization block 332 provides a reference to the location in the memory of the runtime system 100 at which the newly added field A4 resides. Such helper function calls may thus be selectively employed for accessing newly added fields (e.g., via the synchronization block 332 and associated pointer 333), whereas inline arithmetic techniques may be employed to expeditiously access pre-existing fields, whereby pre-existing fields may be accessed at full speed, and an access performance penalty is only experienced for newly added fields. In this regard, the runtime system 100 may ascertain whether a field has been added by edit and continue operations, and accordingly signal the JIT compiler 132 that a particular (e.g., newly added) field be accessed via a call to the helper function.

Figure 17:
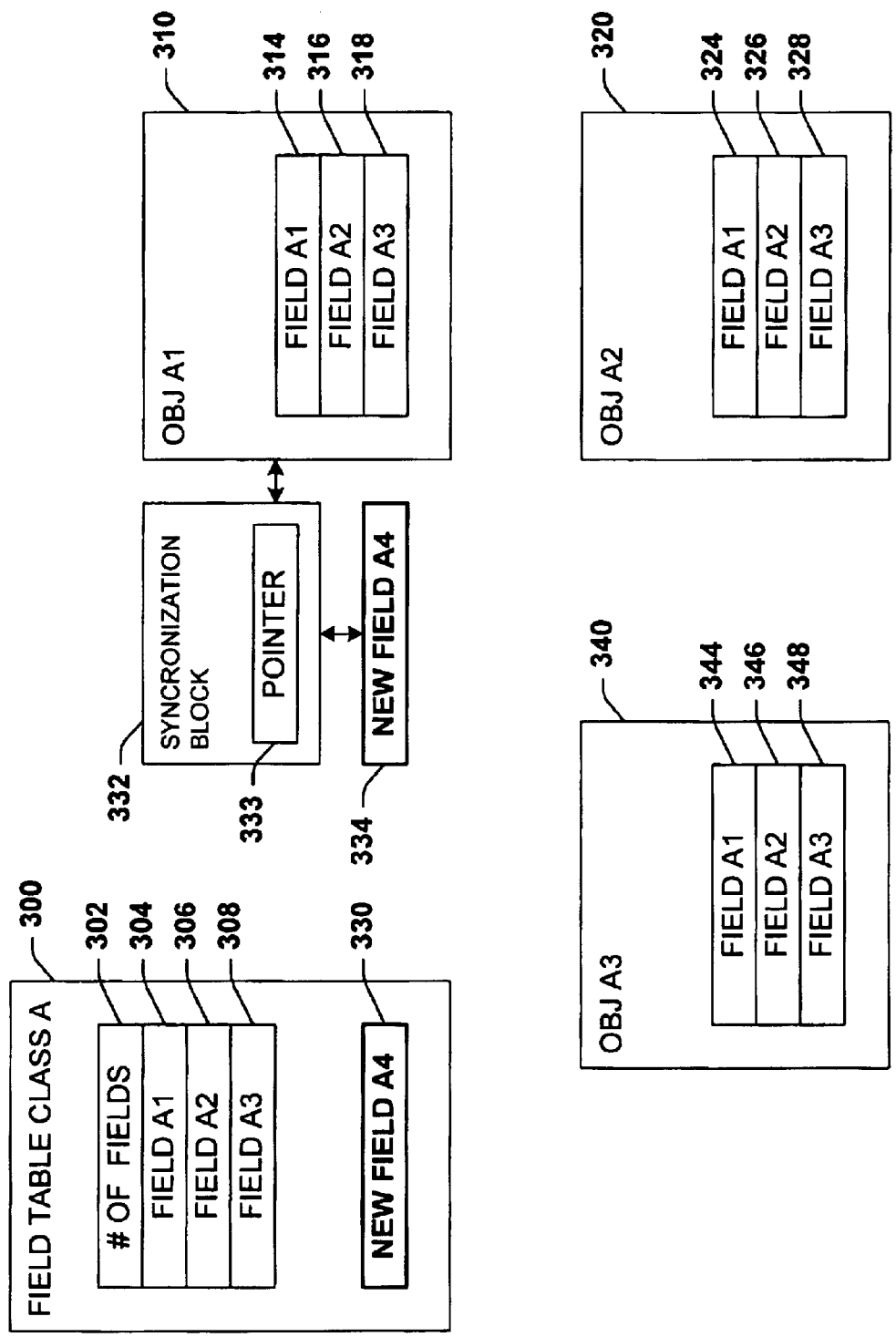
FIG. 17 is a schematic diagram further illustrating the field tables of FIGS. 14–16.
Figure 18:
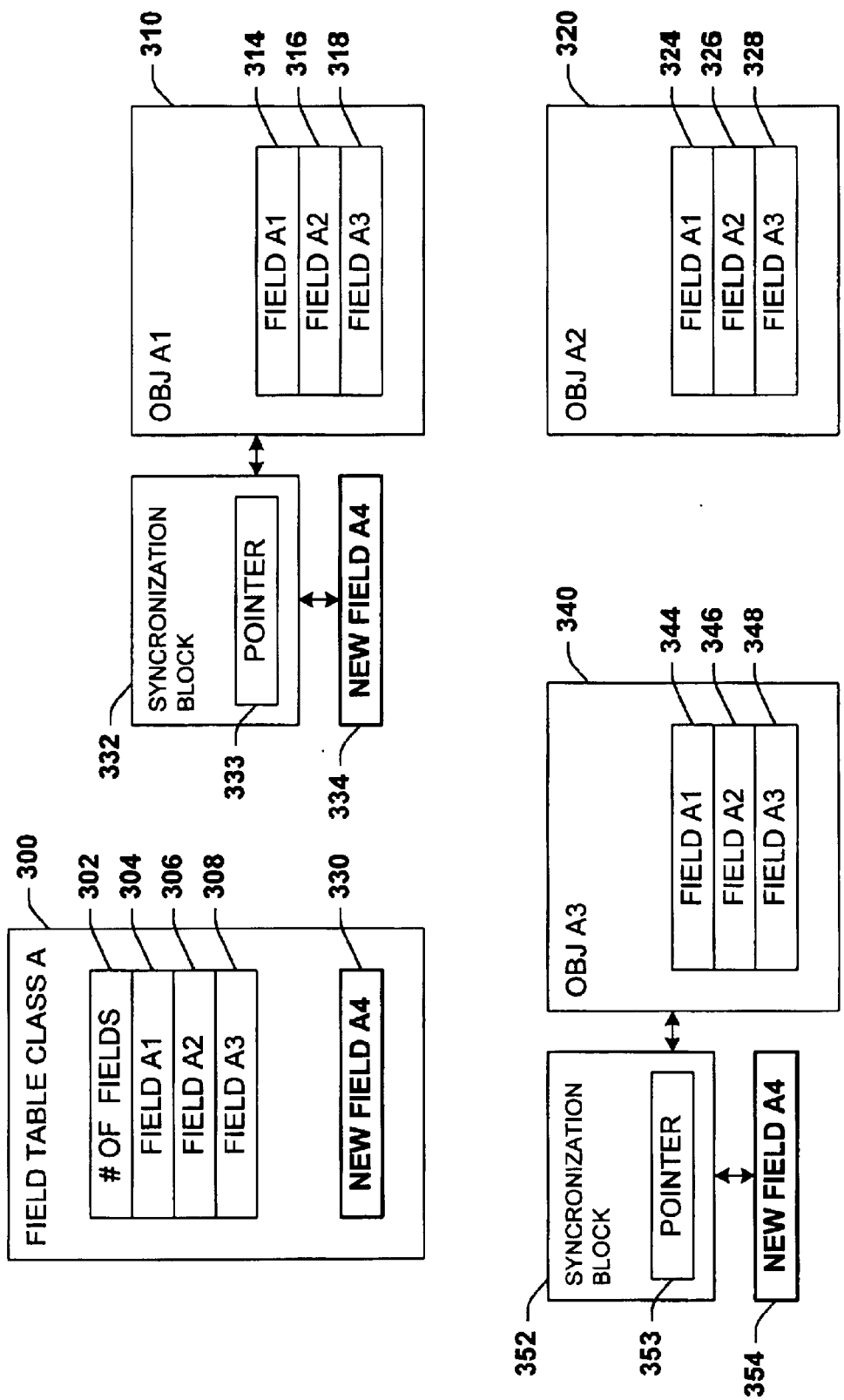
FIG. 18 is a schematic diagram further illustrating the field tables of FIGS. 14–17.
Figure 19:
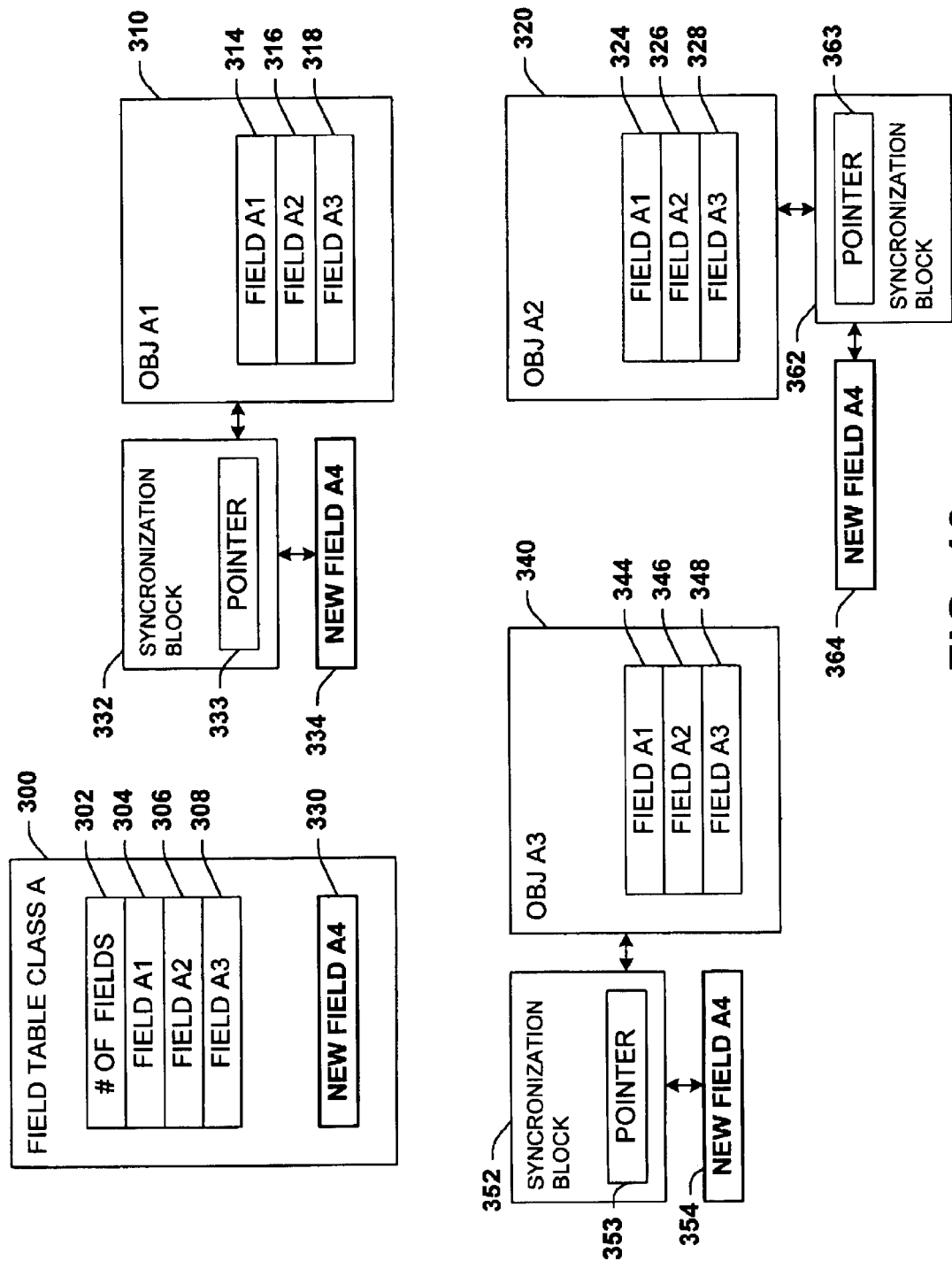
FIG. 19 is a schematic diagram further illustrating the field tables of FIGS. 14–18.

Thereafter, other instances of the class A may be created during program execution, such as object A3, as illustrated in FIG. 17. A corresponding object 340 is created in runtime system memory, including entries 344, 346, and 348, for originally existing fields A1, A2, and A3. Where no subsequent usage of the new object A3 is encountered with respect to the new field A4, the edit and continue component may, but need not, provide a reference to A4 in the new object 340. Referring to FIG. 18, if such a usage occurs, the new object 340 may be extended, for example, using a synchronization block 352 associated with the object 340 and having a corresponding pointer 353, such that a reference 354 to the new field A4 need not be located in contiguous memory with the rest of the object 340. Referring also to FIG. 19, if a reference to the new field A4 is encountered in association with the existing object A2, a reference 364 thereto may be added via a synchronization block 362 associated with the object 320 and having a pointer 363, thereby extending the table.

According to another aspect of the invention, the edit and continue component 104 may allow the user 112 to change an existing method in the source code component 120 by adding a new variable to the existing method. The edit and continue component 104 may substitute edited native code corresponding to the existing method upon a return to the method, which may be determined using a breakpoint. Referring now to FIGS. 3 and 20–28, the runtime system 100 may provide a call stack 400 in memory for use by methods being called during execution of the program. For example, the program may comprise instructions for calling a method A, which in turn calls a method B, which in turn calls a method C, which calls a method D.

Figure 21:
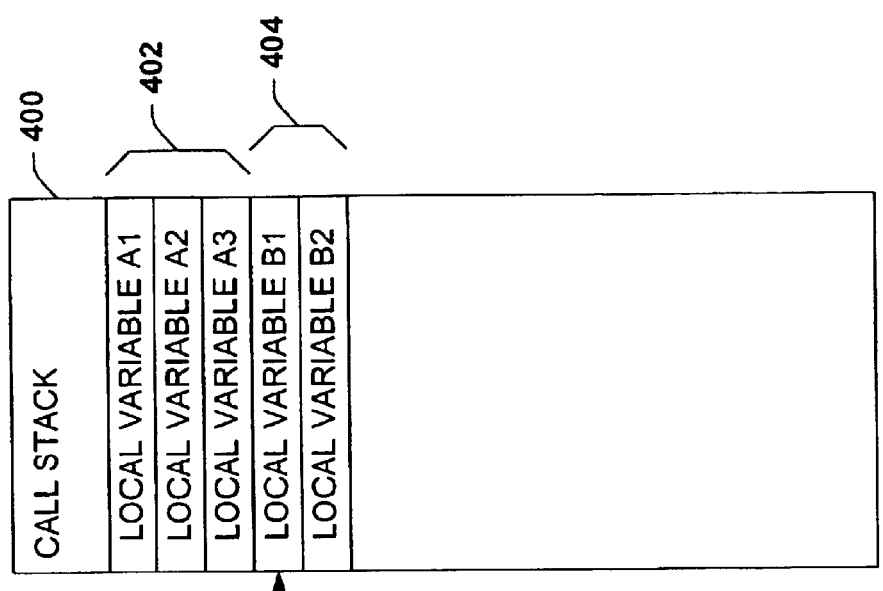
FIG. 21 is a schematic diagram further illustrating the call stack of FIG. 20.
Figure 20:
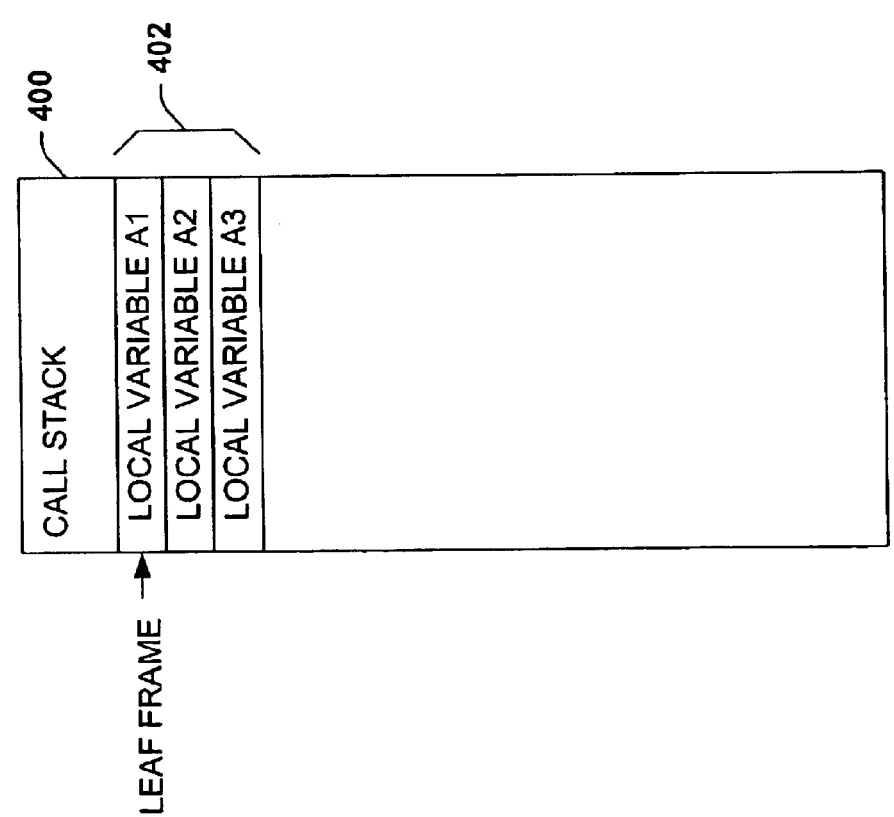
FIG. 20 is a schematic diagram illustrating an exemplary call stack in a common language runtime system.
Figures 22, 23:
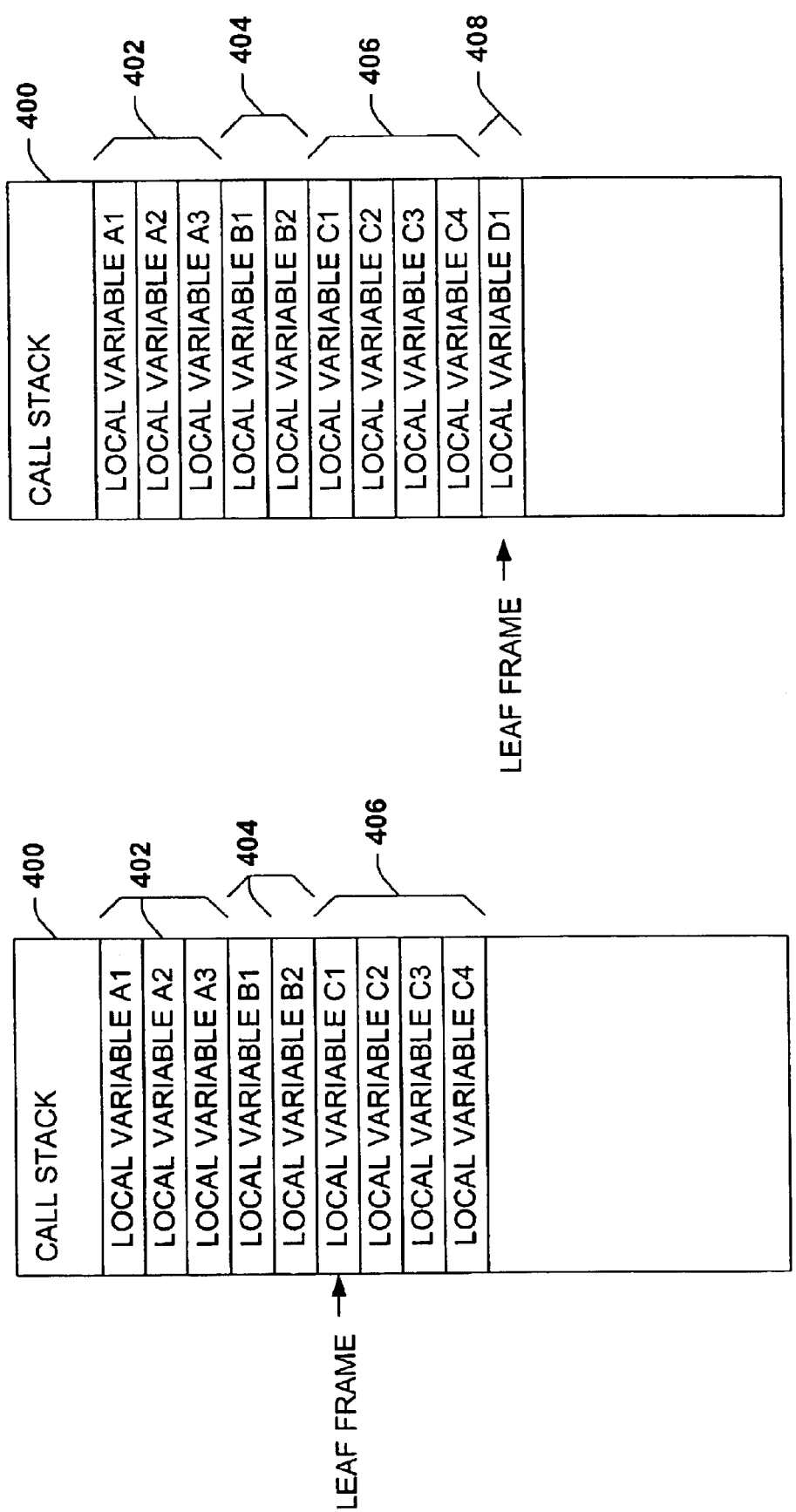
FIG. 22 is a schematic diagram further illustrating the call stack of FIGS. 20–21.
FIG. 23 is a schematic diagram further illustrating the call stack of FIGS. 20–22.

At a point in the program execution where a method A has been called, three variables A1, A2, and A3 associated therewith are placed on the call stack 400 in a call frame 402 for the method A, and a leaf frame is the call frame 402, as illustrated in FIG. 20, wherein the leaf frame is the last frame on a call stack. As illustrated in FIG. 21, when the method B has been called by the method A, two variables B1 and B2 associated with the method B are placed on the call stack 400 in a call frame 404 for the method B. At this point, the frame 404 becomes the leaf frame. Continuing to FIG. 22, when the method C has been called by the method B, four variables C1, C2, C3, and C4 associated with the method C are placed on the call stack 400 in a call frame 406 for the method C, and the frame 406 becomes the leaf frame. Thereafter method C calls method D, as illustrated in FIG. 23. At this point, a single variable D1 associated with the method D is placed on the call stack 400, and the call frame 408 for the method D becomes the leaf frame.

In the present example, the user 112 may desire to make a change to the method A. For instance, the user may be single stepping through a program, and may discover that the method A will not function properly as currently coded. Thus, the user may suspend execution and make one or more changes or edits to the source code component 120, which is then source compiled into an edited intermediate language component (e.g., and associated metadata) via the source compiler 118 as described above. The edited method A' may now comprise a different number of variables than was the case when program execution began. For example, the edited method A' may now comprise five variables A'1, A'2, A'3, A'4, and A'5, whereas the pre-existing method A had only three (e.g., A1, A2, and A3). However, directly substituting the newly added variables to method A (e.g., including the pending call to method A on the call stack 400 at call frame 402) would require displacement of the other call frames beneath frame 402 on the call stack (e.g., call frames 404, 406, and 408, corresponding with methods B, C, and D, respectively). This may cause problems due to other programmatic references to the displaced variables.

However, another aspect of the present invention provides for timely substitution of the newly edited variables for method A (e.g., variables A'1, A'2, A'3, A'4, and A'5) without disturbing the pending execution represented in the call stack. In accordance with this aspect of the invention, the edit and continue component 104 advantageously waits until the program execution returns from the stacked methods D, C, and B (e.g., until the leaf frame is again the call frame 402 for method A). At that point, the method A call frame 402 is the last call frame on the stack, and a substitute call frame for the edited method A (e.g., method A') may be written over the call frame 402.

Referring to FIG. 24, as the execution of the program is resumed, the call to method D returns to the calling method C, whereafter the leaf frame is the call frame 406 associated with method C. Thereafter, as illustrated in FIG. 25, method C returns program control to method B, whereby the leaf frame is the call frame 404 for method B. As shown in FIG. 26, when method B returns and the leaf frame is the call frame 402 (e.g., associated with the unedited or previous version of method A), a substitution of the variables associated with the edited method A will not result in displacement of any important information on the stack. It will be appreciated in this regard that the stack locations previously holding the variables for the now-returned methods B, C, and D, may be safely overwritten without disturbing method results or other useful information related to execution of the program.

As illustrated in FIG. 27, the edit and continue component 104 may advantageously determine that the leaf frame is again the edited method A, and accordingly substitute an edited call frame 410 with the five variables A'1, A'2, A'3, A'4, and A'5 associated with the edited method A' onto the call stack 400. This timely substitution provides for efficient usage of existing code and variables, without the need for relocating existing variables on the stack and tracking or mapping old stack locations into new ones. Rather, the invention provides for efficient edited method variable substitution on the call stack 400 in a timely fashion to avoid disruption of program execution, thereby facilitating the ability of the user 112 to suspend execution, modify source code, and continue execution from the point where it left off.

Figure 28:
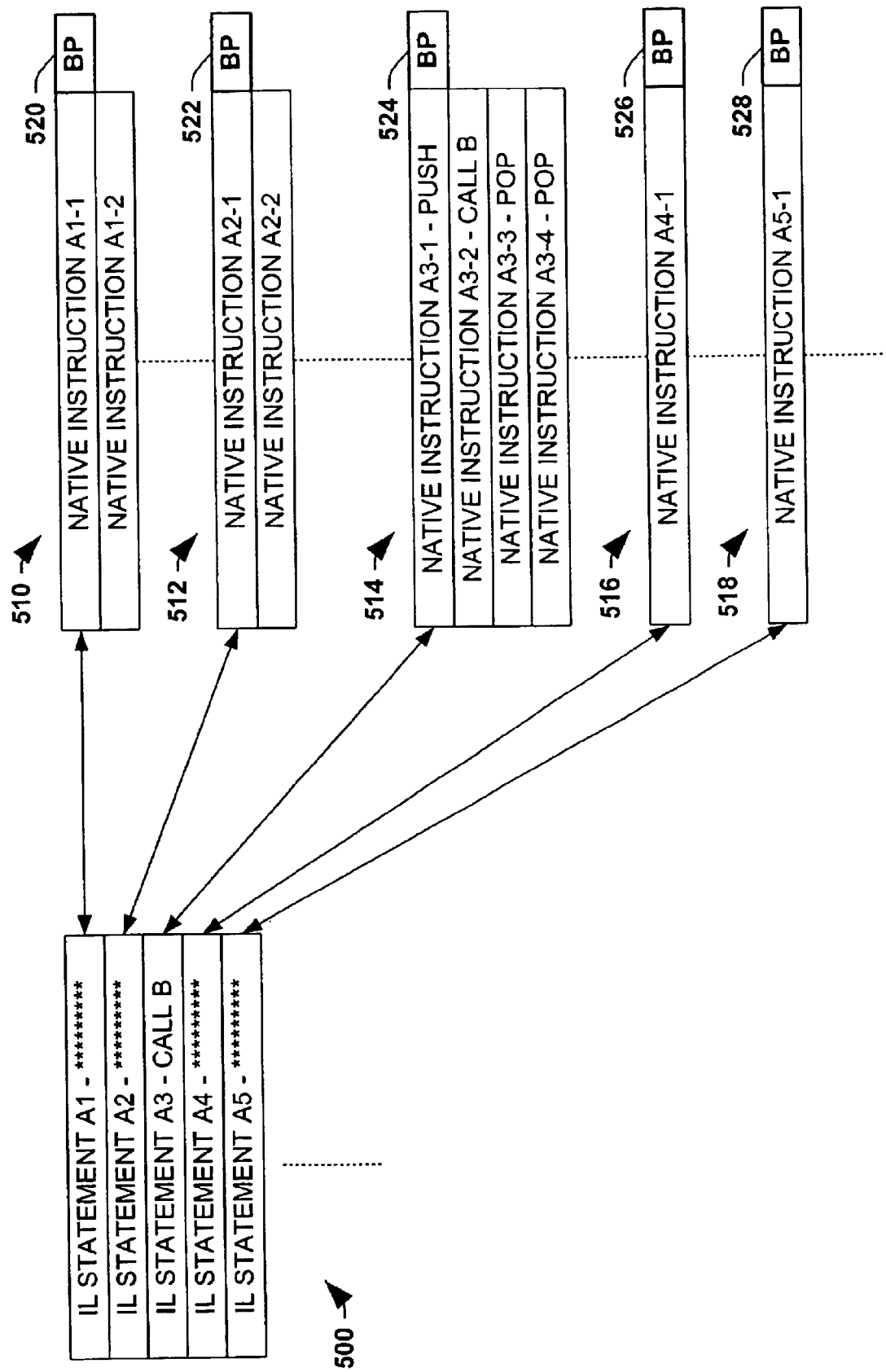
FIG. 28 is a schematic diagram illustrating an exemplary code mapping from an intermediate language component to a native code component according to the invention.

Referring also to FIG. 28, in order to determine or detect the return of execution to method A, (e.g., that the leaf frame again is the call frame 402 for method A), the edit and continue component 104 may set breakpoints in the running native code, such that the debugger application 110 notifies the edit and continue component 104 of the occurrence thereof via the interfaces 106 and 108. The edit and continue component 104 may accordingly detect the break point at the last native instruction corresponding to the changed source line (e.g., a call to method B), and at that point, the component 104 may substitute the call frame 410 onto the call stack 400. As illustrated in FIG. 28, the edited IL code 500 corresponding to the method A' may be JIT compiled (e.g., using the JIT compiler 132) into corresponding native instructions or code (e.g., executable on the processor 130). For instance, a first IL statement A1 in the edited IL component 500 for method A' may correspond with a plurality of native code instructions 510, such as instructions A1-1 and A1-2. The edit and continue component 104 may accordingly insert a breakpoint 520 at the first such native instruction A1-1.

Similarly, edited IL statement A2 corresponds with native instructions 512, where breakpoint 522 is inserted by the edit and continue component 104, and edited IL statement A3 (e.g., a call to method B) corresponds with native instructions 514, where breakpoint 524 is inserted. In like fashion, edited IL statement A4 corresponds with native instructions 516, where breakpoint 526 is inserted, and edited IL statement A5 corresponds with native instructions 518, where breakpoint 528 is inserted by the edit and continue component 104. The edit and continue component 104 may accordingly detect the break point 524, and at that point, the component 104 may substitute the call frame 410 onto the call stack 400.

In accordance with another aspect of the invention, the edit and continue component 104, may advantageously select non-stack storage locations for method variables which have been modified according to program edits by the user 112. For instance, the JIT compiler 132 may selectively employ registers in the processor 130 for variable storage instead of using stack locations, according to various factors, such as variable usage patterns, the nature of the method in which the variable is used, and the need for various specific processor registers to implement the functionality of the method, etc. Thus, an existing native code component implementation of a function may utilize such registers in the processor 130, alone or in combination with memory locations in the call stack 400 for storing variables. Referring to the above example, the edited method A' has five variables (e.g., A'1, A'2, A'3, A'4, and A'5), and the JIT compiler 132 may allocate stack storage for A'2, A'3, and A'4, while utilizing processor registers in the processor 130 for variables A'1 and A'5. In this regard, it will be noted that performance advantages may be achieved by the employment of fast access processor registers as opposed to stack employment, even on a selective basis.

Where the user modifies A' to create A", the edit and continue component 104 may further support the selective employment of processor register storage of variables associated with the edited method A". In this way, the performance advantages associated with such processor register utilization need not be sacrificed while the user 112 is debugging a program. For instance, the user 112 may further edit the method A' to create a twice edited method A" (e.g., by editing the source code using the source code editor 116 of the debugger application 110), wherein method A" includes seven local variables. In accordance with another aspect of the invention, the JIT compiler 132 may advantageously analyze the twice edited method A" and determine, for instance, that improved program performance may be achieved through the employment of register storage for one of the seven variables, and stack storage of the remaining 6. This may be determined, for example, based on the registers needed for implementation of the new functionality of the method A".

Thus, the edit and continue component 104 may employ the JIT compiler 132 to create two translations or mappings for the change from method A' to A". The first is a translation of the old stack mapping for A' to the new stack mapping for A", and the second is a translation from the old register mapping for A' to the new register mapping for A". The translations may then be provided from the JIT compiler 132 to the debugger application 110 via the edit and continue component 104 and the interfaces 106 and 108, whereby the debugger may make appropriate use of this mapping or translation information in providing for further execution and debugging of the program.

Referring again to FIG. 3, the exemplary debugging services interface or API 106 of the edit and continue component 104 allows developers to create debuggers (e.g., debugger application 110) used to debug applications that run in the common language runtime system or environment 100. The source code component 120 to be debugged can be any type of code that is supported by the runtime. The interface 106 may include a collection of objects and interfaces implemented by the runtime system 100 and a collection (e.g., debugger API interface 108) of COM callback interfaces, which may be implemented by the debugger application (e.g., application 110). The debugger application 110, for example, may be written in a language that can access these interfaces and objects for communicating with the runtime system 100 and controlling the runtime execution environment.

Such exemplary debug interfaces may be organized into functional categories, such as: Registration-Interfaces called by the debugger application 110 to register with the runtime system 100 and which request to be notified when specific events occur; Notification-Callback interfaces which may be implemented by the debugger application 110 through which the runtime system 100 notifies the debugger application 110 of various events and returns requested information; Breakpoint-Interfaces called by the debugger application 110 to retrieve information about breakpoints; Execution-Interfaces called by the debugger application 110 to control execution of a debuggee process and access call stacks; Information-Interfaces called by the debugger application 110 to obtain information about the debuggee process; Enumeration-Interfaces called by the debugger application 110 to enumerate objects; and Modification-Interfaces called by the debugger application 110 to modify the code that is being debugged.

Exemplary Debug Interfaces

The exemplary Debug API supplies interfaces for debugging can be organized into the following categories of functionality: Registration; Notification; Breakpoints; Execution; Information; and Enumeration. The following table includes a list of exemplary interfaces and brief descriptions thereof, which may be employed in accordance with the present invention. However, it will be recognized that other interfaces are possible within the scope of the invention, and that the invention is not limited to the interfaces illustrated and described herein.

| Interface | Inherits From | Description |
| --- | --- | --- |
| ICorDebug | IUnknown | The interface pointer to this object represents an event processing loop for a debugger process. |
| ICorDebugAppDomain | ICorDebugController | This interface provides methods that apply to application domains. |
| ICorDebugAppDomainEnum | ICorDebugEnum | This interface provides methods for enumerating application domains. |
| ICorDebugArrayValue | IcorDebugHeapValue | This interface provides methods for accessing array elements. |
| ICorDebugAssembly | IUnknown | This interface provides methods that apply to assemblies. |
| ICorDebugAssemblyEnum | ICorDebugEnum | This interface provides methods for enumerating assemblies. |
| ICorDebugBoxValue | ICorDebugHeapValue | This interface provides methods that apply to boxed value class objects. |
| ICorDebugBreakpoint | IUnknown | This interface provides methods for retrieving information about breakpoints. |
| ICorDebugBreakpointEnum | ICorDebugEnum | This interface provides methods for enumerating breakpoints. |
| ICorDebugChain | IUnknown | This interface provides access to call stacks in the stack chain. |
| ICorDebugChainEnum | ICorDebugEnum | This interface provides methods for enumerating stack chains. |
| ICorDebugClass | IUnknown | This interface provides methods for obtaining information about classes. |
| ICorDebugCode | IUnknown | This interface provides methods for obtaining information about code. |
| ICorDebugContext | ICorDebugObjectValue | This interface provides methods for obtaining information about contexts. |
| ICorDebugController | IUnknown | The ICorDebugContext interface represents a scope at which program execution context can be controlled. It represents either a process or an application domain. |
| ICorDebugEditAndContinue Snapshot | IUnknown | This interface provides methods for Edit & Continue operations. |
| ICorDebugEnum | IUnknown | This interface provides methods for enumerating objects. It is the root of the interface hierarchy for all the enumeration interfaces described below. |
| ICorDebugErrorInfoEnum | ICorDebugEnum | This interface provides methods for enumerating error information objects. |
| ICorDebugEval | IUnknown | This interface provides methods for running code inside the debuggee. |
| ICorDebugFrame | IUnknown | This interface provides access to call stacks within the threads of the debuggee. Each stack frame represents the state of execution within a method. |
| ICorDebugFrameEnum | ICorDebugEnum | This interface provides methods for enumerating stack frames. |
| IcorDebugFunction | IUnknown | This interface provides methods for obtaining information about functions. |
| ICorDebugFunctionBreakpoint | ICorDebugBreakpoint | This interface provides methods for retrieving information about function breakpoints. |
| ICorDebugGenericValue | ICorDebugValue | This interface provides methods for obtaining generic values. |
| ICorDebugHeapValue | ICorDebugValue | This interface provides methods that apply to garbage collected objects. |
| ICorDebugILFrame | ICorDebugFrame | This interface provides methods for obtaining information about IL frames. |
| ICorDebugManagedCallback | IUnknown | This interface provides methods that allow the runtime to communicate with the debugger concerning events in managed code in the debuggee process. |
| ICorDebugModule | IUnknown | This interface provides methods for obtaining information about modules. |
| ICorDebugModuleBreakpoint | ICorDebugBreakpoint | This interface provides methods for retrieving information about module breakpoints. |
| ICorDebugModuleEnum | ICorDebugEnum | This interface provides methods for enumerating modules. |
| ICorDebugNativeFrame | IcorDebugFrame | This interface provides methods for obtaining information about native frames. |
| ICorDebugObjectEnum | ICorDebugEnum | This interface provides methods for enumerating managed objects. |
| ICorDebugObjectValue | ICorDebugValue | This interface provides methods for obtaining values of objects. |

-continued

| Interface | Inherits From | Description |
| --- | --- | --- |
| ICorDebugProcess | ICorDebugController | This interface provides methods for controlling and inspecting a debuggee process. |
| ICorDebugProcessEnum | ICorDebugEnum | This interface provides methods for enumerating process objects. |
| ICorDebugReferenceValue | ICorDebugValue | This interface provides methods that apply to values that are references (to objects). |
| ICorDebugRegisterSet | IUnknown | This interface provides methods for obtaining information about registers. |
| ICorDebugStepper | IUnknown | This interface provides methods for controlling stepping. |
| ICorDebugStepperEnum | ICorDebugEnum | This interface provides methods for enumerating steppers. |
| ICorDebugStringValue | ICorDebugHeapValue | This interface provides methods for obtaining string values. |
| ICorDebugThread | IUnknown | This interface provides access to threads in the runtime. |
| ICorDebugThreadEnum | ICorDebugEnum | This interface provides methods for enumerating thread objects. |
| ICorDebugUnmanagedCallback | IUnknown | This interface provides methods that allow the runtime to communicate with the debugger concerning events in unmanaged code in the debuggee process. |
| ICorDebugValue | IUnknown | This interface provides methods for obtaining values. |
| ICorDebugValueBreakpoint | ICorDebugBreakpoint | This interface provides methods for retrieving information about value breakpoints. |
| ICorDebugValueEnum | ICorDebugEnum | This interface provides methods for enumerating values. |

Exemplary Operating Environment

Figure 29:
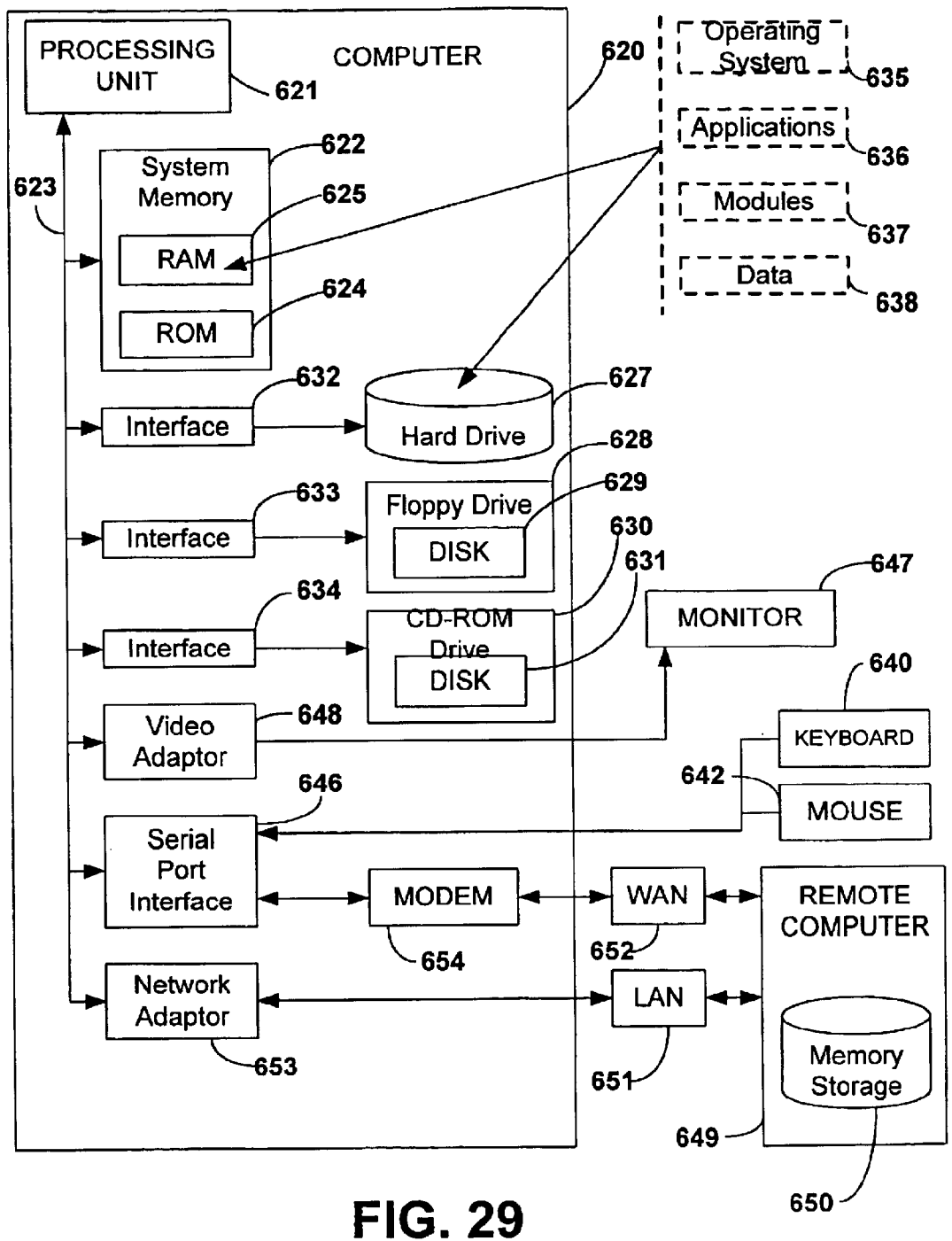
FIG. 29 is a schematic diagram illustrating an exemplary operating environment in which one or more aspects of the invention may be implemented.

In order to provide a context for the various aspects of the invention, FIG. 29 and the following discussion are intended to provide a brief, general description of a suitable computing environment in which the various aspects of the present invention may be implemented. While the invention has been described above in the general context of software tools and computer-executable instructions of a computer program that runs on a computer and/or computers, those skilled in the art will recognize that the invention also may be implemented in combination with other program modules. Generally, program modules include routines, programs, components, data structures, etc. that perform particular tasks and/or implement particular abstract data types. Moreover, those skilled in the art will appreciate that the inventive methods may be practiced with other computer system configurations, including single-processor or multi-processor computer systems, minicomputers, mainframe computers, as well as personal computers, hand-held computing devices, microprocessor-based or programmable consumer electronics, and the like. The illustrated aspects of the invention may also be practiced in distributed computing environments where tasks are performed by remote processing devices that are linked through a communications network. However, some, if not all aspects of the invention can be practiced on stand-alone computers. In a distributed computing environment, program modules may be located in both local and remote memory storage devices.

With reference to FIG. 29, an exemplary environment for implementing various aspects of the invention includes a conventional personal or server computer 620, including a processing unit 621, a system memory 622, and a system bus 623 that couples various system components including the system memory to the processing unit 621. The processing unit 621 may be any of various commercially available processors. Dual microprocessors and other multi-processor architectures also can be used as the processing unit 621. The system bus 623 may be any of several types of bus structure including a memory bus or memory controller, a peripheral bus, and a local bus using any of a variety of conventional bus architectures. The computer memory may include read only memory (ROM) 624 and random access memory (RAM) 625. A basic input/output system (BIOS), including the basic routines that help to transfer information between elements within the computer 620, such as during start-up, is stored in ROM 624.

The computer 620 further includes a hard disk drive 627, a magnetic disk drive 628, e.g., to read from or write to a removable disk 629, and an optical disk drive 630, e.g., for reading a CD-ROM disk 631 or to read from or write to other optical media. The hard disk drive 627, magnetic disk drive 628, and optical disk drive 630 are connected to the system bus 623 by a hard disk drive interface 632, a magnetic disk drive interface 633, and an optical drive interface 634, respectively. The drives and their associated computer-readable media provide nonvolatile storage of data, data structures, computer-executable instructions, etc. for the computer 620, including for the storage of broadcast programming in a suitable digital format.

Although the description of computer-readable media above refers to a hard disk, a removable magnetic disk and a CD-ROM, it will be appreciated by those skilled in the art that other types of media which are readable by a computer, such as zip drives, magnetic cassettes, flash memory cards, digital video disks, Bernoulli cartridges, and the like, may also be used in the exemplary operating environment, and further that any such media may include computer-executable instructions for performing the methods of the present invention. A number of program modules may be stored in the drives and RAM 625, including an operating system 635, one or more application programs 636, other program modules 637, and program data 638.

A user may enter commands and information into the computer 620 through a keyboard 640 and a pointing device, such as a mouse 642. Other input devices (not shown) may include a microphone, an IR remote control, a joystick, a game pad, a satellite dish, a scanner, or the like. These and other input devices are often connected to the processing unit 621 through a serial port interface 646 that is coupled to the system bus 623, but may be connected by other interfaces, such as a parallel port, a game port, a universal serial bus ("USB"), an IR interface, etc. A monitor 647 or other type of display device is also connected to the system bus 623 via an interface, such as a video adapter 648. In addition to the monitor, a computer typically includes other peripheral output devices (not shown), such as speakers, printers etc.

The computer 620 may operate in a networked environment using logical connections to one or more remote computers, such as a remote computer(s) 649. The remote computer(s) 649 may be a workstation, a server computer, a router, a personal computer, microprocessor based entertainment appliance (e.g., a WebTV client system), a peer device or other common network node, and typically includes many or all of the elements described relative to the computer 620, although, for purposes of brevity, only a memory storage device 650 is illustrated. The logical connections depicted include a local area network (LAN) 651 and a wide area network (WAN) 652. Such networking environments are commonplace in offices, enterprise-wide computer networks, intranets and the Internet.

When used in a LAN networking environment, the computer 620 is connected to the local network 651 through a network interface or adapter 653. When used in a WAN networking environment, the computer 620 typically includes a modem 654, or is connected to a communications server on the LAN, or has other means for establishing communications over the WAN 652, such as the Internet. The modem 654, which may be internal or external, is connected to the system bus 623 via the serial port interface 646. In a networked environment, program modules depicted relative to the computer 620, or portions thereof, may be stored in the remote memory storage device 650. It will be appreciated that the network connections shown are exemplary and other means of establishing a communications link between the computers may be used.

Although the invention has been shown and described with respect to certain implementations, it will be appreciated that equivalent alterations and modifications will occur to others skilled in the art upon the reading and understanding of this specification and the annexed drawings. In particular regard to the various functions performed by the above described components (assemblies, devices, circuits, systems, etc.), the terms (including a reference to a "means") used to describe such components are intended to correspond, unless otherwise indicated, to any component which performs the specified function of the described component (i.e., that is functionally equivalent), even though not structurally equivalent to the disclosed structure, which performs the function in the herein illustrated exemplary applications and implementations of the invention. As used in this application, the term "component" may refer to a computer-related entity, either hardware, a combination of hardware and software, software, or software in execution. For example, a component may be, but is not limited to, a process running on a processor, a processor, an object, an executable, a thread of execution, a program, and a computer. By way of illustration, both an application running on a server and the server can be a component.

In addition, while a particular feature of the invention may have been disclosed with respect to only one of several aspects or implementations of the invention, such a feature may be combined with one or more other features of the other implementations as may be desired and advantageous for any given or particular application. Furthermore, to the extent that the terms "includes", "including", "has", "having", and variants thereof are used in either the detailed description or the claims, these terms are intended to be inclusive in a manner similar to the term "comprising" and its variants.

What has been described above includes examples of the present invention. It is, of course, not possible to describe every conceivable combination of components or methodologies for purposes of describing the present invention, but one of ordinary skill in the art may recognize that many further combinations and permutations of the present invention are possible. Accordingly, the present invention is intended to embrace all such alterations, modifications and variations that fall within the spirit and scope of the appended claims.

What is claimed is:

1. A method of editing a software program in a common language runtime environment, the software program having a source code component, an intermediate language component, and a native code component, the method comprising:

executing a first portion of the native code component;

suspending execution of the native code component at a first point;

allowing a user to edit the source code component to create an edited source code component;

compiling the edited source code component using a source compiler to create an edited intermediate language component;

compiling the edited intermediate language component using an intermediate language compiler to create an edited native code component;

executing the edited native code component beginning at the first point; and compiling the edited source code component using the source compiler, compiling the edited intermediate language component, and executing the edited native code component on an as-needed basis.

2. The method of claim 1, wherein allowing a user to edit the source code component comprises allowing the user to add a new field to an object of a class.

3. The method of claim 2, wherein compiling the edited intermediate language component comprises extending a field table associated with the class to accommodate the new field to create an extended field table, and wherein executing the edited native code component comprises employing the extended field table.

4. The method of claim 3, wherein extending the field table comprises adding the new field via a synchronization block associated with the object to create an extended object.

5. The method of claim 1, wherein allowing a user to edit the source code component comprises allowing the user to add a new field to a class.

6. The method of claim 5, wherein allowing a user to edit the source code component comprises allowing the user to add a new field to a class where at least one instance of the class has already been created.

7. The method of claim 1, wherein allowing a user to edit the source code component comprises allowing the user to add a new method to a class.

8. The method of claim 7, wherein the new method is a virtual method.

9. The method of claim 8, wherein compiling the edited intermediate language component comprises extending a virtual method table associated with the program to accommodate the new method to create an extended virtual method table, and wherein executing the edited native code component comprises employing the extended virtual method table.

10. The method of claim 9, wherein the extended virtual method table comprises first and second memory portions, and wherein extending the virtual method table comprises providing a reference to the new method in the second memory portion.

11. The method of claim 10, wherein the first and second memory portions of the extended virtual method table are non-contiguous, and wherein extending the virtual method table comprises creating a call to the new method using a reference to the second memory portion.

12. The method of claim 11, wherein the second memory portion is located so as to maximize a slot index.

13. The method of claim 12, wherein executing the edited native code component comprises substituting edited native code corresponding to the existing method upon a return to the method.

14. The method of claim 13, further comprising determining a return to the method using a breakpoint.

15. The method of claim 1, wherein allowing a user to edit the source code component comprises allowing the user to change an existing method in the source code component.

16. The method of claim 15, wherein allowing the user to change an existing method comprises allowing the user to add a new variable to the existing method.

17. The method of claim 16, wherein allowing the user to change an existing method comprises allowing the user to add a new variable to the existing method when the existing method is on at least one thread call stack.

18. The method of claim 15, wherein allowing the user to change an existing method comprises allowing the user to change an algorithm in the existing method.

19. The method of claim 1, wherein allowing a user to edit the source code component comprises allowing the user to replace an existing method created in a first source language with a new method created in a second source language.

20. The method of claim 1, wherein allowing a user to edit the source code component comprises allowing the user to change a first source component associated with a first native component to create an edited first source component, wherein compiling the edited source code component comprises compiling the edited first source component using the source compiler to create an edited first intermediate language component, wherein compiling the edited intermediate language component comprises compiling the edited first intermediate language component using the intermediate language compiler to create an edited first native component, and wherein executing the edited native code component beginning at the first point comprises executing the edited first native component.

21. A method of editing a software program having a source code component, and a native code component, the method comprising:

executing a first portion of the native code component;

suspending execution of the native code component at a first point;

allowing a user to edit the source code component to create an edited source code component, add a new field to an object of a class to the source code component, add a new method to a class in the source code component, change an existing method in the source code component, and replace an existing method created in a first source language with a new method created in a second source language;

converting the edited source code component to create an edited native code component comprising extending a field table associated with the class to accommodate the new field to create an extended field table, extending the field table comprising adding the new field via a synchronization block associated with the object to create an extended object; and executing the edited native code component employing the extended field table beginning at the first point.

22. The method of claim 21, wherein adding a new method to a class comprises adding a new virtual method to the class.

23. The method of claim 22, wherein converting the edited source code component comprises extending a virtual method table associated with the program to accommodate the new virtual method to create an extended virtual method table, and wherein executing the edited native code component comprises employing the extended method table.

24. The method of claim 23, wherein the extended virtual method table comprises first and second memory portions, and where extending the virtual method table comprises providing a reference to the new virtual method in the second memory portion.

25. The method of claim 24, wherein the first and second memory portions of the extended virtual method table are non-contiguous, and wherein extending the virtual method table comprises creating a call to the new virtual method using a reference to the second memory portion.

26. The method of claim 25, wherein creating a call to the new virtual method comprises computing an offset from the first memory portion to the second memory portion.

27. The method of claim 26, wherein the second memory portion is located so as to maximize a slot index.

28. The method of claim 21, wherein changing an existing method comprises adding a new variable to the existing method.

29. The method of claim 28, wherein executing the edited native code component comprises substituting edited native code corresponding to the existing method upon a return to the method.

30. The method of claim 29, further comprising determining a return to the method using a breakpoint.

31. The method of claim 21, wherein changing an existing method comprises changing an algorithm in the existing method.

32. The method of claim 31, wherein allowing the use to change an existing method comprises allowing the user to add a new variable to the existing method when the existing method is on at least one thread call stack.

33. A runtime system for executing a program in a computer system, comprising:

an edit and continue component having a debugging services interface component interfacing with a debugger application; and an intermediate language compiler adapted to compile intermediate language code into native code;

wherein the edit and continue component executes a first portion of a native code component, suspends execution of the native code component at a first point, allows a user to edit a source code component using a debugger application to create an edited source code component, allows a user to add a new field to an object of a class, extends a field table associated with the class to accommodate the new field to create an extended field table, adds the new field via a synchronization block associated with the object to create an extended object, compiles the edited source code component using a source compiler to create an edited intermediate language component, compiles the edited intermediate language component using the intermediate language compiler to create an edited native code component, and executes the edited native code component beginning at the first point.

34. The system of claim 33, wherein the edit and continue component allows a user to add a new method to a class.

35. The system of claim 34, wherein the new method is a virtual method.

36. The system of claim 35, wherein the edit and continue component extends a virtual method table associated with the program to accommodate the new method to create an extended virtual method table.

37. The system of claim 36, wherein the extended virtual method table comprises first and second memory portions, and wherein the edit and continue component provides a reference to the new method in the second memory portion.

38. The system of claim 37, wherein the first and second memory portions of the extended virtual method table are non-contiguous.

39. The system of claim 38, wherein the second memory portion is located so as to maximize a slot index.

40. The system of claim 33, wherein the edit and continue component allows a user to change an existing method in the source code component.

41. The system of claim 40, wherein the edit and continue component allows a user to add a new variable to the existing method.

42. The system of claim 41, wherein the edit and continue component allows a user to add a new variable to the existing method when the existing method is on at least one thread call stack.

43. The system of claim 41, wherein the edit and continue component substitutes edited native code corresponding to the existing method upon a return to the method.

44. The system of claim 43, wherein the edit and continue component determines a return to the method using a breakpoint.

45. The system of claim 40, wherein the edit and continue component allows the user to change an algorithm in the existing method.

46. The system of claim 33, wherein the edit and continue component allows a user to replace an existing method created in a first source language with a new method created in a second source language.

47. The system of claim 33, wherein the edit and continue component compiles the edited source code component, compiles the edited intermediate language component, and executes the edited native code component on an as-needed basis.

48. A system for editing a software program in a common language runtime environment, the software program having a source code component, an intermediate language component, and a native code component, the system comprising:

mean for executing a first portion of the native code component;

means for suspending execution of the native code component at a first point;

means for allowing a user to edit the source code component to create an edited source code component;

means for compiling when necessary the edited source code component using a source compiler to create an edited intermediate language component;

mean for compiling when desired the edited intermediate language component using an intermediate language compiler to create an edited native code component; and means for executing on demand the edited native code component beginning at the first point.

49. A system for editing a software program having a source code component, and a native code component, the system comprising:

means for executing a first portion of the native code component;

means for suspending execution of the native code component at a first point;

means for allowing a user to edit the source code component to create an edited source code component, add new field to an object of a class to the source code component, add a new method to a class in the source code component, change an existing method in the source code component, and replace an existing method created in a first source language with a new method created in a second source language;

means for converting the edited source code component to create an edited native code component comprising extending a field table associated with the class to accommodate the new field to create an extended field table, extending the field table comprising adding the new field via a synchronization block associated with the object to create an extended object; and means for executing the edited native code component utilizing the extended field table beginning at the first point.

50. A computer-readable medium comprising computer-executable instructions for:

executing a first portion of a native code component;

suspending execution of the native code component at a first point;

allowing a user to edit a source code component to create an edited source code component;

compiling on request the edited source code component using a source compiler to create an edited intermediate language component;

compiling on demand the edited intermediate language component using an intermediate language compiler to create an edited native code component; and executing the edited native code component beginning at the first point as required.

51. A computer-readable medium comprising computer-executable instructions for:

executing a first portion of a native code component;

suspending execution of the native code component at a first point;

allowing a user to edit a source code component to create an edited source code component, add a new field to an object of a class to the source code component, add a new method to a class in the source code component, change an existing method in the source code component, and replace an existing method created in a first source language with a new method created in a second source language;

converting the edited source code component to create an edited native code component comprising extending a field table associated with the class to accommodate the new field to create an extended field table, extending the field table comprising adding the new field via a synchronization block associated with the object to create an extended object; and executing the edited native code component utilizing the extended field table beginning at the first point.

52. A runtime system for executing a program in a computer system, comprising:

an edit and continue component having a debugging services interface component interfacing with a debugger application;

wherein the edit and continue component executes a first portion of a native code component, suspends execution of the native code component at a first point, allows a user to edit a source code component using the debugger application to create an edited source code component, add a new field to an object of a class, extend a field table associated with a class to accommodate a new field to create an extended field table, add the new field via a synchronization block associated with the object to create the extended object, converts the edited source code component into an edited native code component, and executes the edited native code component beginning at the first point.

53. The system of claim 52, wherein the edit and continue component converts the edited source code component by compiling the edited source code component using a source compiler to create an edited intermediate language component, and compiling the edited intermediate language component using the intermediate language compiler to create the edited code component.

* * * * *